United States Patent
Guizilini et al.

(10) Patent No.: US 12,361,575 B2
(45) Date of Patent: Jul. 15, 2025

(54) DEPTH ESTIMATION WITH SPARSE RANGE SENSOR DEPTH AND UNCERTAINTY PROJECTION

(71) Applicant: TOYOTA RESEARCH INSTITUTE, INC., Los Altos, CA (US)

(72) Inventors: Vitor Guizilini, Santa Clara, CA (US); Jie Li, Los Altos, CA (US); Charles Christopher Ochoa, San Francisco, CA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 109 days.

(21) Appl. No.: 17/834,850

(22) Filed: Jun. 7, 2022

(65) Prior Publication Data
US 2023/0394691 A1   Dec. 7, 2023

(51) Int. Cl.
*G06T 7/521* (2017.01)
*G01S 13/86* (2006.01)
(Continued)

(52) U.S. Cl.
CPC ............ *G06T 7/521* (2017.01); *G01S 13/867* (2013.01); *G01S 13/89* (2013.01); *G06V 10/803* (2022.01);
(Continued)

(58) Field of Classification Search
None
See application file for complete search history.

(56) References Cited

U.S. PATENT DOCUMENTS

| 10,755,428 B2 | 8/2020 | Aswin |
| 11,062,454 B1 | 7/2021 | Cohen |

(Continued)

FOREIGN PATENT DOCUMENTS

| CN | 109461178 A | 3/2019 |
| CN | 112016612 A | 12/2020 |

(Continued)

OTHER PUBLICATIONS

Natour et al., "Toward 3D Reconstruction of Outdoor Scenes Using an MMW Radar and a Monocular Vision Sensor," Sensors (Basel), 15(10):25937-25967, Oct. 14, 2015 (https://doi.org/10.3390/s151025937).

(Continued)

*Primary Examiner* — Talha M Nawaz
(74) *Attorney, Agent, or Firm* — SHEPPARD, MULLIN, RICHTER & HAMPTON LLP; Daniel N. Yannuzzi

(57) ABSTRACT

Systems and methods are provided for depth estimation from monocular images using a depth model with sparse range sensor data and uncertainty in the range sensor as inputs thereto. According to some embodiments, the methods and systems comprise receiving an image captured by an image sensor, where the image represents a scene of an environment. The method and systems also comprise deriving a point cloud representative of the scene of the environment from range sensor data, and deriving range sensor uncertainty from the range sensor data. Then a depth map can be derived for the image based on the point cloud and the range sensor uncertainty as one or more inputs into a depth model.

20 Claims, 10 Drawing Sheets

(51) Int. Cl.
*G01S 13/89* (2006.01)
*G06V 10/80* (2022.01)

(52) U.S. Cl.
CPC .............. *G06T 2207/10028* (2013.01); *G06T 2207/20068* (2013.01); *G06T 2207/20081* (2013.01); *G06T 2207/30248* (2013.01)

(56) References Cited

U.S. PATENT DOCUMENTS

| | | | |
|---|---|---|---|
| 11,450,016 B1* | 9/2022 | Lu | G06T 7/73 |
| 2014/0253679 A1* | 9/2014 | Guigues | H04N 13/128 |
| | | | 348/42 |
| 2018/0202814 A1* | 7/2018 | Kudrynski | G01C 21/3815 |
| 2018/0203122 A1* | 7/2018 | Grauer | G01S 17/89 |
| 2019/0226853 A1* | 7/2019 | Kubiak | G06V 20/56 |
| 2021/0019536 A1* | 1/2021 | Motoyama | G01C 21/3811 |
| 2021/0042982 A1* | 2/2021 | Trajkovic | G06T 15/00 |
| 2022/0341751 A1* | 10/2022 | Abdelrahman | G01S 17/89 |
| 2022/0342427 A1* | 10/2022 | Motoyama | G08G 5/21 |
| 2022/0373686 A1* | 11/2022 | Megerdichian | G01S 7/4817 |
| 2023/0107281 A1* | 4/2023 | Levi | B60Q 1/143 |
| | | | 362/466 |

FOREIGN PATENT DOCUMENTS

| | | |
|---|---|---|
| CN | 112001958 B | 2/2021 |
| CN | 112329678 A | 2/2021 |
| CN | 112990129 B | 7/2021 |
| CN | 113409376 A | 9/2021 |

OTHER PUBLICATIONS

Walz et al., "Uncertainty Depth Estimation with Gated Images for 3D Reconstruction," Mar. 11, 2020, 8 pages (https://arxiv.org/abs/2003.05122).

Lin et al., "Depth Estimation from Monocular Images and Sparse Radar Data," 2020 IEEE/RSJ International Conference on Intelligent Robots and Systems (IROS), pp. 10233-10240, Sep. 30, 2020 (https://doi.org/10.1109/IROS45743.2020.9340998).

* cited by examiner

DEPTH ESTIMATION WITH SPARSE RANGE SENSOR DEPTH AND UNCERTAINTY PROJECTION

TECHNICAL FIELD

The present disclosure relates generally to systems and methods for depth estimation from images, and in particular, to depth estimation from a depth model with sparse range sensor data and uncertainty in the range sensor as inputs thereto.

DESCRIPTION OF RELATED ART

Various systems that operate autonomously, semi-autonomously or that provide information about a surrounding environment use sensors that facilitate perceiving obstacles and additional aspects of the surrounding environment. For example, an autonomous or semi-autonomous system may use information from the sensors to develop an awareness of the surrounding environment in order to navigate through the environment. In particular, the autonomous or semi-autonomous system uses the perceived information to determine a 3-D structure of the environment in order to identify navigable regions and avoid potential hazards. The ability to perceive distances through estimation of depth using sensor data provides the autonomous or semi-autonomous system with the ability to plan movements through the environment and generally improve situational awareness about the environment.

However, depending on the available onboard sensors, the autonomous or semi-autonomous system may acquire a limited perspective of the environment, and, thus, may encounter difficulties in distinguishing between aspects of the environment.

That is, various sensors perceive different aspects of the environment differently and also have different implementation characteristics. For example, a light detection and ranging (LiDAR) sensor is effective at perceiving depth in the surrounding environment but suffers from difficulties such as high costs and can encounter errors in certain weather conditions, while radar sensors suffer from sparsity and noise. Moreover, other sensors, such as stereo cameras, function to effectively capture depth information but also suffer from difficulties with cost, limited field-of-view, and so on. While monocular cameras can be a cost-effective approach, the sensor data from such cameras does not explicitly include depth information. Instead, the autonomous or semi-autonomous system implements processing routines that derive depth information from the monocular images.

However, leveraging monocular images to perceive depth can also suffer from difficulties such as limited resolution, image artifacts, difficulties with training the processing routines (e.g., expensive or limited availability of training data), and so on. As such, many difficulties associated with determining depth data persist that may result in reduced situational awareness for a system, and, thus, difficulties in navigating or performing other associated functions. As such, difficulties associated with determining depth data from monocular images persist such as creating accurate depth maps for depth estimation and other difficulties that may result in reduced situational awareness for a system, and, thus, difficulties in navigating or performing other associated functions.

BRIEF SUMMARY OF THE DISCLOSURE

According to various embodiments of the disclosed technology, systems and methods for depth estimation for monocular images using a depth model having sparse range sensor data and uncertainty on one or more input channels.

In accordance with some embodiments, a method for depth estimation from monocular images is provided. The methods comprises receiving an image captured by an image sensor, the image representing a scene of an environment; deriving, based on range sensor data, a point cloud representative of the scene of the environment; deriving range sensor uncertainty from the range sensor data; and deriving a depth map for the image based on the point cloud and the range sensor uncertainty as one or more inputs into a depth model.

In another aspect, a system is provided that comprises a memory and one or more processors that are configured to execute machine readable instructions stored in the memory for performing a method. The method comprises receiving an image captured by an image sensor, the image comprising pixels representing a scene of an environment; generating depth data by projecting a 3D point cloud generated by a radar sensor onto a 2D image plane, the 3D point cloud representing the scene of the environment; deriving a 3D covariance matrix from the depth data; and deriving a depth map for the image based on the depth data and the 3D covariance matrix as one or more inputs into a depth model.

In another aspect, a non-transitory computer-readable medium for training a depth model for depth estimation from images is provided. The non-transitory computer-readable medium includes instructions that when executed by one or more processors cause the one or more processors to receive an image representing a scene of an environment; obtain depth data based on a point cloud representing the scene of the environment generated by a range sensor; derive uncertainty in the depth data based on the point cloud; generate a depth map for the image based on the depth data and the uncertainty as one or more inputs into a depth model; and train the depth model using a pose model to account for motion between the image and a source image.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
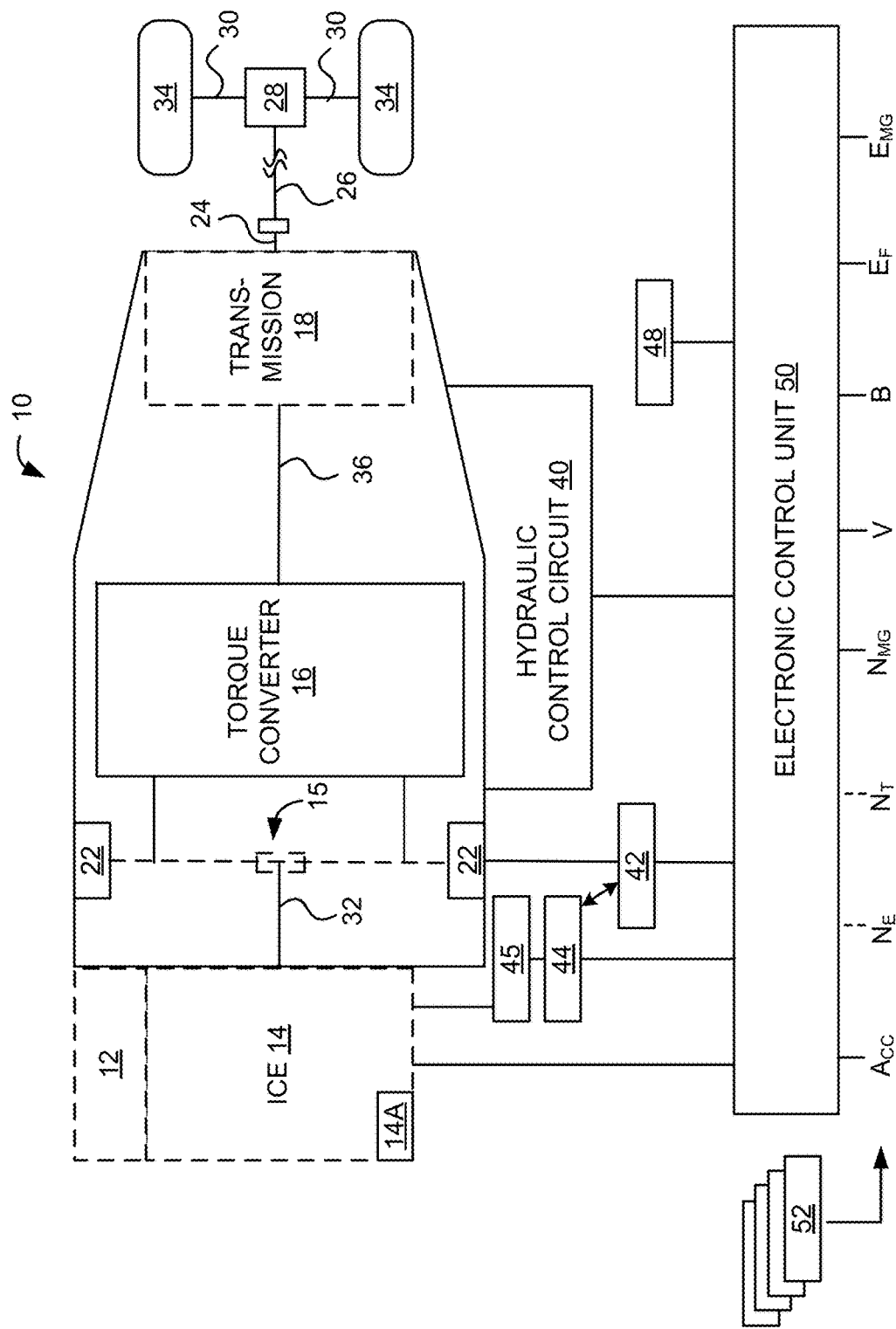
FIG. 1 is a schematic representation of an example vehicle with which embodiments of semi-supervised scale-aware learning systems and methods disclosed herein may be implemented.

The figures are not exhaustive and do not limit the present disclosure to the precise form disclosed.

DETAILED DESCRIPTION

Embodiments of the systems and methods disclosed herein provide depth estimations for monocular images derived from a depth model. For example, embodiments of the present disclosure may utilize sparse depth data from a range sensor as additional information that is input onto a channel of the depth model (also referred to herein as a depth network) for depth estimation from monocular image sources. In various embodiments, the sparse depth data is generated using a radar senor. As alluded to above, radar sensors suffer from sparsity and noise. Thus, to account for such sparsity and noise, embodiments herein derive uncertainty in the range sensor data, which filters out the noise and sparsity to improve ground-truths used in training the depth model. For example, embodiments herein estimate the noise and sparsity as the uncertainty in the range sensor data, which is incorporated into the sparse depth data input into the depth model or is explicitly input into the depth model via an additional input channel.

Embodiments of the present disclosure utilizes images and sparse depth data from range sensors, along with uncertainty in the sparse depth data to generate depth maps for use in depth estimates. In various embodiments, the images are captured by monocular image sensors. As previously noted, perceiving aspects of the surrounding environment by inferring depths from monocular images can involve various difficulties such as erroneously defining depths at discontinuities, and so on. Therefore, in one embodiment, a depth system is disclosed that improves the processing of monocular images to resolve depth estimates by implementing a novel architecture for a machine learning model. In various embodiments, the novel architecture involves the use of sparse depth data as an input into the machine learning model, along with a corresponding monocular image as a separate input.

That is, in various embodiments, sparse depth data is provide by a radar sensor as a point cloud containing a sparse number of measurement points. For example, depth data (e.g., depth data at nearly a per-pixel level with a corresponding image) can be expensive to produce due to the use of expensive high fidelity sensors (e.g., 64 beam LiDAR devices), and monocular video alone may involve various difficulties for estimating depth therefrom. Thus, the embodiments disclosed herein overcome these technical difficulties by using sparse depth data to supplement depth estimation using the machine learning model without reliance on more comprehensive/dense depth data from depth sensors having a high fidelity. For example, embodiments herein may utilize radar sensors to acquire depth data in place of LiDAR. Radar sensors offer cost advantage over other sources of depth information, such as velocity measurements, inertial sensors, LiDAR, camera extrinsic, etc. Furthermore, radar sensor are generally cheaper, consume less energy, and are smaller in size for easier placement on or within a given device or system.

However, while radar sensors may be less expensive than high fidelity sensors, measurements from such sensors are subject to noise and sparsity. For example, the noise values can be due to range errors (e.g., a point is closer/further away than measured), radial errors (e.g., the point projection is not where it should be), and/or multiple reflections detected for a given object in the scene. Additionally, the quantity of depth measures possible with a radar sensor is significantly fewer than that offered by high fidelity range sensors, such as LiDAR. Thus, embodiments disclosed herein estimate the noise and sparsity as an uncertainty derived from the sparse depth data that is provided to the machine learning model as an input. The Thus, the machine learning model receives a monocular image representing a scene of an environment, sparse depth data generated by radar sensor for the same environment, and the uncertainty derived from the sparse depth data as inputs, which are used to derive depth estimates for the monocular image in the form of a depth map. The uncertainty, input into the depth model, filters out the noise and sparsity in the radar sensor and provides for improved ground-truths used in training the model.

In one example, the uncertainty is projected onto the sparse depth data from the radar sensor, resulting in blurred sparse depth data. For example, the point cloud from the radar sensor can be projected onto an image plane and the uncertainty estimated as a covariance matrix from the point cloud that is projected onto the same image plane. Thus, the points on the image plane from the point cloud are blurred in an area, resulting in blurred sparse depth data. The blurred sparse depth data may be provided on an input channel to the machine learning model and used, in conjunction with the monocular image input on a separate channel, to estimate depths for the monocular image. The ground-truth depth used for estimating depths is provided as an area as a result of the blurred sparse depth data, opposed to localized to a single point.

In another example, the uncertainty is explicitly provided on an additional input channel into the machine learning model. For example, similar to the pervious example, the uncertainty can be estimated as a covariance matrix derived from the point cloud generated by the radar sensor. The covariance matrix is projected onto an image plane, which is input into the machine learning model on a first input channel. Additionally, the point cloud is projected onto an image plane which is input into the machine learning model a second input channel and the monocular image is input on a third input channel.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well.

An example hybrid electric vehicle (HEV) in which embodiments of the disclosed technology may be implemented is illustrated in FIG. 1. Although the example described with reference to FIG. 1 is a hybrid type of vehicle, the systems and methods for process of semi-supervised scale-aware learning of a depth model for monocular depth estimation can be implemented in other types of vehicle including gasoline- or diesel-powered vehicles, fuel-cell vehicles, electric vehicles, or other vehicles.

FIG. 1 illustrates a drive system of vehicle 10 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

Vehicle 10 may be driven/powered with either or both of engine 14 and motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be a hybrid electric vehicle (HEV) travel mode that uses engine 14 and the motor(s) 22 as the sources of motive power. In the engine-only and HEV travel modes, vehicle 10 relies on the motive force generated at least by internal combustion engine 14, and clutch 15 may be included to engage engine 14. In the EV travel mode, vehicle 10 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from electronic control unit 50, described below. Such output control can include, for example, throttle control, fuel injection control, and ignition timing control.

Motor 22 can also be used to provide motive power in vehicle 10 and is powered electrically via battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move vehicle 10 and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of vehicle 10. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 10 may include electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units or using a single electronic control unit.

In the example illustrated in FIG. 1, electronic control unit 50 receives information from a plurality of sensors 52 included in vehicle 10. For example, electronic control unit 50 may receive signals that indicate vehicle operating conditions or characteristics, or signals that can be used to derive vehicle operating conditions or characteristics. These may include, but are not limited to accelerator operation amount (ACC), a revolution speed (N E), of internal combustion engine 14 (engine RPM), a rotational speed of the motor 22 (motor rotational speed), and vehicle speed, NV. These may also include torque converter 16 output (e.g., output amps indicative of motor output), brake operation amount/pressure, B, battery (i.e., the charged amount for battery 44 detected by a system on chip (SOC) sensor). Accordingly, vehicle 10 can include a plurality of sensors 52 that can be used to detect various conditions internal or external to the vehicle and provide sensed conditions to electronic control unit 50 (which, again, may be implemented as one or more individual control circuits). In one embodiment, sensors 52 may be included to detect one or more conditions directly or indirectly such as, for example, fuel efficiency ($E_F$), motor efficiency ($E_{MG}$), hybrid (e.g., ICE 14 and MG 22) efficiency, acceleration, ACC, etc.

Additionally, one or more sensors 52 can be configured to detect, and/or sense position and orientation changes of the vehicle 10, such as, for example, based on inertial acceleration, trajectory, and so on. In one or more arrangements, electronic control unit 50 can obtain signals from vehicle sensor(s) including accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, electronic control unit 50 receives signals from a speedometer to determine a current speed of the vehicle 10.

Sensors 52 may be included to detect not only vehicle conditions but also to detect environment conditions external and/or internal to the vehicle. Sensors that might be used to detect external conditions can include, for example, distance measuring sensors or range sensors (e.g., sonar senor, radar sensor, LiDAR, infra-red cameras, and the like), vehicle proximity sensors, and image sensors (e.g., cameras or other image sensors). In some embodiments, cameras can be high dynamic range (HDR) cameras or infrared (IR) cameras. Image and range sensors can be used to detect the environment surrounding the vehicle 10, for example, traffic signs, road curvature, obstacles, and so on. Still other sensors may include those that can detect road grade.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output. Additionally, as alluded to above, the one or more sensors 52 can be configured to detect, and/or sense in real-time. As used herein, the term "real-time" means a level of processing responsiveness that a user or system senses as sufficiently immediate for a particular process or determination to be made, or that enables the processor to keep up with some external process.

According to an embodiment, vehicle 10 can be an autonomous vehicle. As used herein, "autonomous vehicle" can refer to a vehicle that is configured to operate in an autonomous operational mode. "Autonomous operational mode" can refer to the use of one or more computing systems of the vehicle 10 to navigate and/or maneuver vehicle 10 along a travel route with a level of input from a human driver which can vary with the operational mode, for example, based on information detected by sensors 52. As such, vehicle 10 can have a plurality of autonomous operational modes. In some embodiments, vehicle 10 can have an unmonitored autonomous operational mode, meaning that one or more computing systems are used to maneuver vehicle 10 along a travel route fully autonomously, requiring no input or supervision required from a human driver.

Alternatively, or in addition to the above-described modes, vehicle 10 can have one or more semi-autonomous operational modes. "Semi-autonomous operational mode" can refer to mode whereby a portion of the navigation and/or maneuvering of vehicle 10 along a travel route is performed by one or more computing systems, for example, based on information detected by sensors 52, while a portion of navigation and/or maneuvering of vehicle 10 along the travel route is performed by a human driver. One example of a semi-autonomous operational mode is an adaptive cruise control system. In such case, the speed of vehicle 10 can be automatically adjusted to maintain a safe distance from a vehicle ahead based on data received from on-board sensors, but vehicle 10 is otherwise operated manually by a human driver. Another example of a semi-autonomous operational mode include Advanced Driver-Assistance Systems (ADAS), such as, forward/rear collision detection and warning systems, pedestrian detection systems, etc.

The example of FIG. 1 is provided for illustration purposes only as an example of vehicle systems with which embodiments of the disclosed technology may be implemented. Embodiments herein are not limited to automobiles. For example, embodiments herein may be implemented in any electronic/robotic device or another form of powered transport that, for example, perceives an environment according to environment sensors. Additionally, embodiments herein may be implemented in a statically mounted device, an embedded device, or another device that uses environment sensor data to derive depth information about a scene or that separately trains the depth model for deployment in such a device. For example, embodiments herein may be implemented in a server (e.g., a physical, dedicated sever or a cloud-based server coupled to a database resident on network), and the resulting depth model may be communicated to other remote devices for use in autonomous and/or semi-autonomous operational modes. Thus, one of ordinary skill in the art reading this description will understand how the disclosed embodiments can be implemented with any vehicle, robotic, and/or computation platform.

Figure 2:
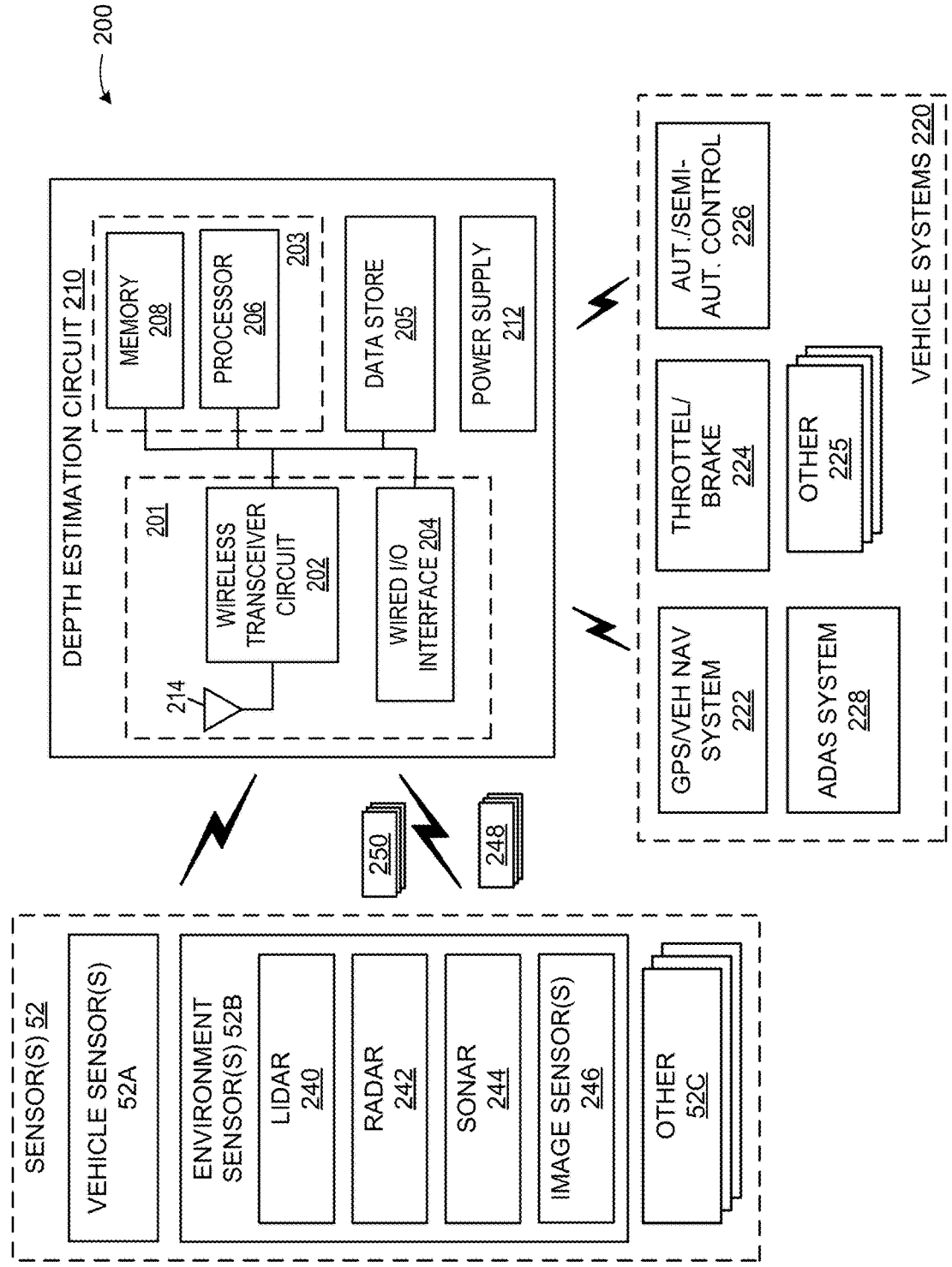
FIG. 2 illustrates an example architecture for depth estimation in accordance with embodiments of the systems and methods described herein.

FIG. 2 illustrates an example architecture for depth estimation in accordance with one embodiment of the systems and methods described herein. In this example, depth estimation system 200 includes a depth estimation circuit 210, the plurality of sensors 52, and one or more vehicle systems 220. Sensors 52 and vehicle systems 220 can communicate with depth estimation circuit 210 via a wired or wireless communication interface. Depth estimation circuit 210 can be implemented, for example, as an ECU or as part of an ECU such as, for example ECU 50 of vehicle. In other embodiments, depth estimation circuit 210 can be implemented independently of an ECU, for example, as a stand-alone computing component (e.g., cloud-based server resident on a network, physical or dedicated server, software-as-a-service (SaaS), distributed computing service, etc.).

Depth estimation circuit 210, in this example, includes a communication circuit 201, a decision circuit 203 (including a processor 206 and memory 208 in this example), data store 205, and a power supply 212. Components of depth estimation circuit 210 are illustrated as communicating with each other via a data bus, although other communication in interfaces can be included.

Processor 206 can include a GPU, CPU, microprocessor, or any other suitable processing system. Memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208 can be made up of one or more modules of one or more different types of memory and may be configured to store data and other information as well as operational instructions that may be used by the processor 206 to control depth estimation circuit 210. For example, memory 208 may store one or more modules, for example, as computer-readable instructions that when executed by the processor 206 cause the processor 206 to perform the various functions and operations of the depth estimation circuit 210.

Data store 205 may be an electronic data structure such as a database. The data store 205 may be stored in the memory 208 or another memory. The data store 205 may be configured with routines that can be executed by the processor 206 for analyzing stored data, providing stored data, organizing stored data, and so on. Accordingly, the data store 205 may store data used by the processor 206 in executing various functions. The data store 205 may also receive and store data from sensors 52 and/or vehicle systems 220, for example, for use by the processor 206 in executing operations and functions of the depth estimation circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a depth estimation circuit 210.

Communication circuit 201 either or both a wireless transceiver circuit 202 with an associated antenna 214 and a wired I/O interface 204 with an associated hardwired data port (not illustrated). As this example illustrates, communications with depth estimation circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by depth estimation circuit 210 to/from other entities, such as, sensors 52, vehicle systems 220, edge devices (e.g., remote network node, edge computing devices, etc.), and the cloud (e.g., cloud-based server resident on network, etc.).

Wired I/O interface 204 can include a transmitter and a receiver (not shown) for hardwired communications with other devices. For example, wired I/O interface 204 can provide a hardwired interface to other components, including sensors 52 and vehicle systems 220. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 52 can include, for example, those described above with reference to the example of FIG. 1. Sensors 52 can include additional sensors that may or not otherwise be included on a standard vehicle 10 with which the depth estimation system 200 is implemented. In the illustrated example, sensors 52 include one or more vehicle sensors 52A. The vehicle sensor(s) 52A can detect, determine, and/or sense information about the vehicle 10. For example, vehicle sensor(s) 52A can be configured to detect, and/or sense position and orientation changes of the vehicle 10, such as, for example, based on inertial acceleration. In various embodiments, the vehicle sensor(s) 52A can include one or more accelerometers (e.g., to detect roll, pitch, and yaw of the vehicle), one or more gyroscopes, an inertial measurement unit (IMU). The vehicle sensor(s) 52A can also be configured to detect, and/or sense one or more characteristics of the vehicle 10. For example, vehicle sensor(s) 52A may include vehicle acceleration sensors, vehicle speed sensors, throttle and brake pedal sensors, steering sensors, wheelspin sensors (e.g., one for each wheel), tire pressure monitoring system (TPMS), proximity sensors, etc.

Sensors 52 also includes environment sensors 52B configured to acquire, and/or sense environment data surrounding the vehicle and/or internal to the vehicle. Environment data includes data or information about the external and/or internal environment in which vehicle 10 is located or one or more portions thereof. For example, the one or more environment sensors 52B can be configured to detect, quantify and/or sense obstacles in at least a portion of the external environment of the vehicle 10 and/or information/data about such obstacles. Such obstacles may be stationary objects and/or dynamic objects. The one or more environment sensors 52B can be configured to detect, measure, quantify and/or sense other things in the external environment, such as, for example, other vehicles, pedestrians, lane markers, signs, traffic lights, traffic signs, lane lines, crosswalks, curbs proximate the vehicle 10, off-road objects, etc. As another example, alone or in addition to the above, the one or more environment sensors 52B can be configured to detect, quantify and/or sense obstacles in at least a portion of the internal environment of the vehicle 10 and/or information/data about such environment.

Environment sensors 52B includes one or more range sensors such as, but not limited to, LiDAR 240, radar sensor 242, sonar 244, IR sensors and other like sensors that can be used to gather data (e.g., data 250) to measure distances and closing rates to various external objects. Environment sensors 52B also includes one or more image sensors 246, such as cameras (e.g., visible light cameras, IR cameras, thermal cameras, ultrasound cameras, and other cameras) or other image sensors, to capture images 248 of the environment around the vehicle. Information from image sensors 246 can be used, for example, by vehicle systems 220 to determine information about the environment surrounding the vehicle 10 including, for example, information regarding other objects surrounding vehicle 10. For example, image sensors 246 capture video images 248 from which vehicle systems 220 may be able to recognize landmarks or other features (including, e.g., street signs, traffic lights, etc.), slope of the road, lines on the road, curbs, objects to be avoided (e.g., other vehicles, pedestrians, bicyclists, etc.) and other landmarks or features. Information from image sensors 246 can be used in conjunction with other information such as map data or information from navigation system 222 to determine, refine or verify vehicle location.

In various embodiments, one or more of image sensor 246 are monocular image sensors configured to capture monocular videos as a plurality of frames in the form of monocular images (e.g., images 248). As described herein, a "monocular image" is an image from a single (e.g., monocular) camera, and encompasses a field-of-view (FOV) of at least a portion of the surrounding environment (e.g., a subregion of the surrounding environment). A monocular image may not include any explicit additional modality indicating depth nor any explicit corresponding image from another camera from which the depth can be derived (e.g., no stereo image sensor pair). In contrast to a stereo image, that may integrate left and right images from separate cameras mounted side-by-side to provide an additional depth channel, a monocular image does not include explicit depth information such as disparity maps derived from comparing the stereo images pixel-by-pixel. Instead, a monocular image may implicitly provide depth information in the relationships of perspective and size of elements depicted therein. The monocular image may be of a forward-facing (e.g., the direction of travel), 60-degree FOV, 90-degree FOV, 120-degree FOV, a rear/side facing FOV, or some other subregion based on the positioning and characteristics of the image sensor 246 on a vehicle (e.g. vehicle 10).

Monocular images include visual data of the FOV that is encoded according to an image standard (e.g., codec) associated with the image sensor 246. Characteristics of the image sensor 246 and the image standard define a format of the image. Thus, while the particular characteristics can vary according to different implementations, the image 248 has a defined resolution (e.g., height and width in pixels) and format based on the image sensor 246 and image standard. For example, the monocular images may be based on a red-green-blue (RGB) color model. In further aspects, the images can be infrared images associated with a corresponding infrared camera, a black/white images, cyan-magenta-yellow (CMY) images based on the CMY color model, or another suitable format as may be desired.

Additional sensors 52C may be provided as well. Various sensors 52 may be used to provide input to depth estimation circuit 210 and other vehicle systems 220 so that the systems have information useful to operate in an autonomous, semi-autonomous or manual mode.

Vehicle systems 220 can include any of a number of different vehicle components or subsystems used to control or monitor various aspects of a vehicle, e.g., vehicle 10, and its performance. In this example, vehicle systems 220 include a GPS or other vehicle positioning system 222; throttle/brake circuits 224 (e.g., to control operation of motor/generator 22, to control the operation of the engine including internal combustion engine 14, and/or control operation of a brake system to decelerate the vehicle); ADAS systems 228 (e.g., to control operation of obstacle detection and warning, forward and/or read collision detection, etc.); autonomous and/or semi-autonomous control systems 226 (e.g., to control operation of navigation and/or maneuvering according to autonomous or semi-autonomous operational modes), and other vehicle systems 282.

During operation, depth estimation circuit 210 can receive information from various vehicle sensors and/or vehicle systems 220 to perform depth estimation. Communication circuit 201 can be used to transmit and receive information between depth estimation circuit 210 and sensors 52, and depth estimation circuit 210 and vehicle systems 220. Also, sensors 52 may communicate with vehicle systems 220 directly or indirectly (e.g., via communication circuit 201 or otherwise).

In various embodiments, communication circuit 201 can be configured to receive data and other information from sensors 52 that is used in determining training and deploying a depth model according to embodiment disclosed herein. Additionally, communication circuit 201 can be used to send data and information to various vehicle systems 220 as part of performing operations of the respective vehicle systems 220. The decision regarding what action to take via these various vehicle systems 220 can be made based on the information detected by sensors 52 and application of a trained depth model. Examples of this are described in more detail below.

Once trained, the depth model may be employed, for example, to analyze images 248 (e.g., monocular images) from an image sensor 246 and provide a depth estimation in the form of a depth map to additional vehicle systems 220. For example, processor 206 may generate a depth map from images 248 and provide the depth map to the vehicle systems 220. For example, a depth map may be provided to ADAS system 228 (e.g., to control operation of obstacle detection and warning, forward and/or read collision detection, etc.), autonomous and/or semi-autonomous control systems 226 (e.g., to control operation of navigation and/or maneuvering according to autonomous or semi-autonomous operational modes), and other operation of the vehicle systems 220.

In another example, a depth map may be communicated (e.g., via communication circuit 201) to a remote system (e.g., cloud-based systems, edge devices, etc.) as, for example, a mechanism for mapping the surrounding environment or for other purposes (e.g., traffic reporting, etc.). As yet another example, the depth map may be communicated (e.g., via communication circuit 201) to map locations of obstacles in the surrounding environment and plan a trajectory that safely navigates the obstacles. Thus, the depth map may be used to control the vehicle 10 to navigate through the surrounding environment.

Figure 3:
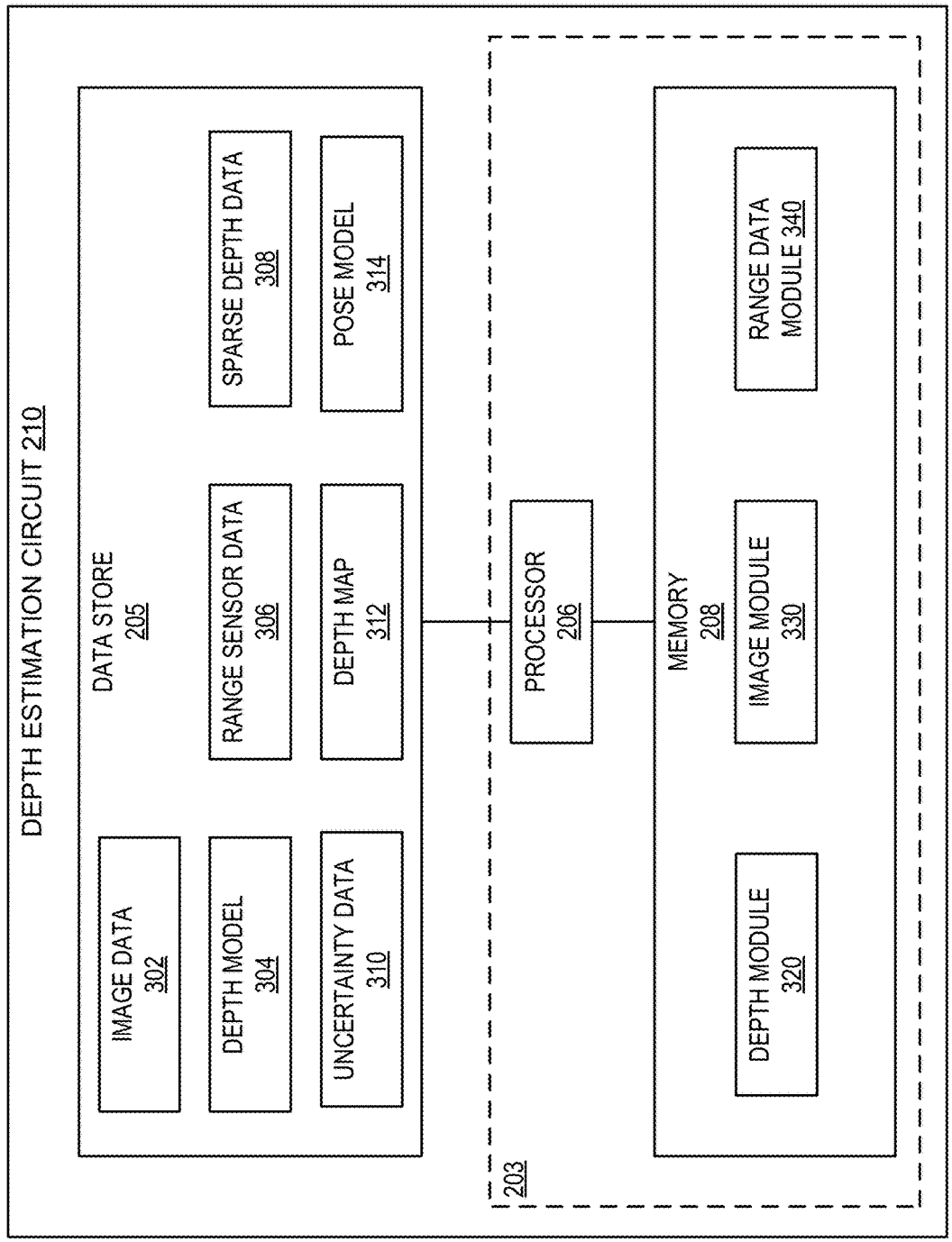
FIG. 3 illustrates a schematic block diagram of an example depth estimation circuit in accordance with embodiments of the systems and methods described herein.

FIG. 3 illustrates a schematic block diagram of an example depth estimation circuit 210 in accordance with embodiments of the systems and methods described herein. As alluded to above, depth estimation circuit 210 may be provided to train and implement a depth model to process images (e.g., images 248) and provide depth estimates for an environment (e.g., objects, surfaces, etc.) depicted therein.

Memory 208 may be configured to store, for example, a depth module 320, an image module 330, and a range data module 340. The modules 320, 330, and 340 are, for example, computer-readable instructions that when executed by the processor 206 cause the processor 206 to perform the various functions disclosed herein. The data store 205 may be configured to store data used by the modules 320, 330 and 340 in executing various functions. In the illustrative example of FIG. 3, the data store 205 stores image data 302, a depth model 304, range sensor data 306, sparse depth data 308, uncertainty data 310, depth map(s) 312, and a pose model 314 along with, for example, other information that is used by the modules 320, 330, and 340.

The image data 302 generally includes one or more monocular images (e.g., monocular image 248) each containing a scene of an environment surrounding the image sensor (e.g., image sensor 246) that captures the image, a plurality of which define a monocular video. The image data 302 may be RGB images or images according to a desired color model, as described above. Each monocular image may implicitly provide depth information (e.g., depth values) of the scene in the relationships of perspective and size of elements depicted therein from which the depth model 304 may derive a depth map 312 for the respective image. The depth map 312 may comprise a plurality of pixels arranged in two dimensional space (e.g., X and Y) and comprise a depth value for the respective image. These depth values may be derived using the depth model 304 based on the depth information implicit to the monocular image and depth measures from the sparse depth data 308 and uncertainty data 310, as described below.

Range sensor data 306 includes data received from one or more range sensors (e.g., radar sensor 242). The range sensor data 306 includes depth measures indicating distances from the range sensor to features in the surrounding environment. The range sensor data 306 may be provided as a 3D point cloud. The 3D point cloud is sparse or generally incomplete for a corresponding scene such that only sparsely distributed points within a scene are annotated by the depth measures as opposed to a dense point cloud that provides per-pixel depth measures or nearly per-pixel depth measures for the scene. That is, only those points for which a depth measure is detected by the range sensor are included in point cloud. A point cloud is generally provided in a 3D coordinate space (e.g., X, Y, and Z).

While the range sensor data 306 is generally described as originating from a radar sensor, embodiments herein are applicable to depth data from LiDAR or another range sensors. Furthermore, the range sensor data 306 itself generally includes depth/distance information relative to a point of origin such as the range sensor, and may also include coordinates (e.g., x, y within an image) corresponding with separate depth measurements.

In various embodiments, range sensor data 306 is projected onto an image plan to derive sparse depth data 308. For example, the 3D point cloud included in the range sensor data 306 may be projected onto a 2D point image plan annotated with depth measures based on Z coordinates of points in the point cloud. For example, each point of the 3D point cloud is provided at a position within a 3D coordinate space (e.g., X, Y, and Z). The X and Y coordinates of each point can be projected to x and y coordinates on the 2D image plane, such that each point in the 3D point cloud corresponds to a pixel in the 2D image plane. Each projected pixel is then annotated with a depth measure derived from the Z coordinate of the corresponding point, which is a depth measurement for the pixel. In a case of where the sparse depth data 308 is provided as a sparse depth map, each pixel on the 2D image plane can be annotated with a visual attribute (e.g., a color or other visual marker) corresponding to the depth measure of the corresponding point relative to other points in the point cloud.

Various range sensor, such as radar sensors, suffer from sparsity such that the 3D point cloud is sparsely populated. Thus, when the 3D point cloud is projected to a 2D image plane, some x and y coordinates in the image plane may correspond to positions within the 3D coordinates that do not contain a point (e.g., the range sensor did not detect a returned signal for the position). In this case, the pixels on the 2D image plane are deemed invalid, because the pixel does not have any valid depth measures due to a lack of a projected point. As such, the 2D image plane contains a sparse number of pixels and is referred to herein as a sparse depth data 308.

Figure 4A:
FIGS. 4A-4D illustrate different examples of depth data for a scene.
Figure 4B:
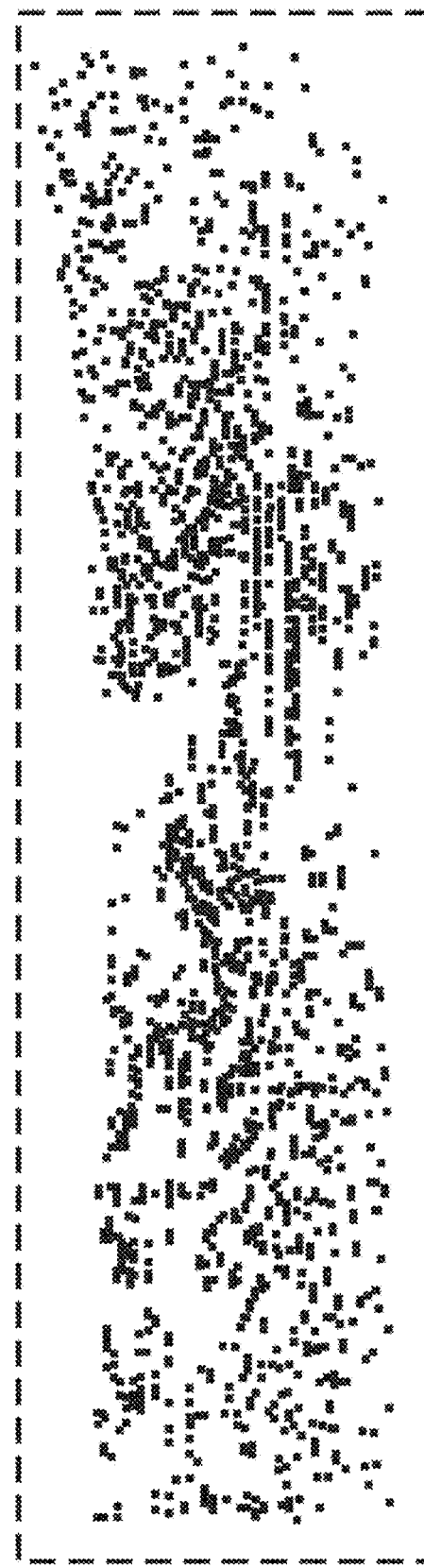

For example, FIG. 4A illustrates a monocular image 410 of a scene, which may be an example of a monocular image included in image data 302. While image 410 is illustrated as a grayscale image, image 410 may be an RGB or other color model based image. FIG. 4B is an example depth data 420 generated from a 3D point cloud of the scene shown in image 410, provided by a LiDAR device, which is projected onto a 2D image plane. The LiDAR device in this example may include 64 scanning beams. Thus, the 3D point cloud used to generate the depth data 420 includes about 1,427 separate points. Even though the point cloud includes substantially fewer points than the number of pixels of the image 410, the depth data 420 provides nearly per-pixel level depth measures for the corresponding image 410. However, depth data 420 represents a significant cost to acquire over a monocular image. These costs and other difficulties generally relate to an expense of a LiDAR sensor that includes produces a denser representation (e.g., 64 separate beams), difficulties in calibrating this type of LiDAR device with the monocular camera, storing large quantities of data associated with the point cloud for each separate image, and so on.

Accordingly, embodiments herein may utilize radar sensors to acquire depth data in place of LiDAR. Radar sensors offer cost advantage over other sources of depth information, such as velocity measurements, inertial sensors, LiDAR, camera extrinsic, etc. For example, in the case of LiDAR sensors, while LiDAR may offer more precise depth measurements, the depth measurements collected by LiDAR may represent a significant cost and other difficulties as outlined above. Furthermore, radar sensor are generally cheaper, consume less energy, and are smaller in size for easier placement on or within vehicle 10.

Figure 4C:
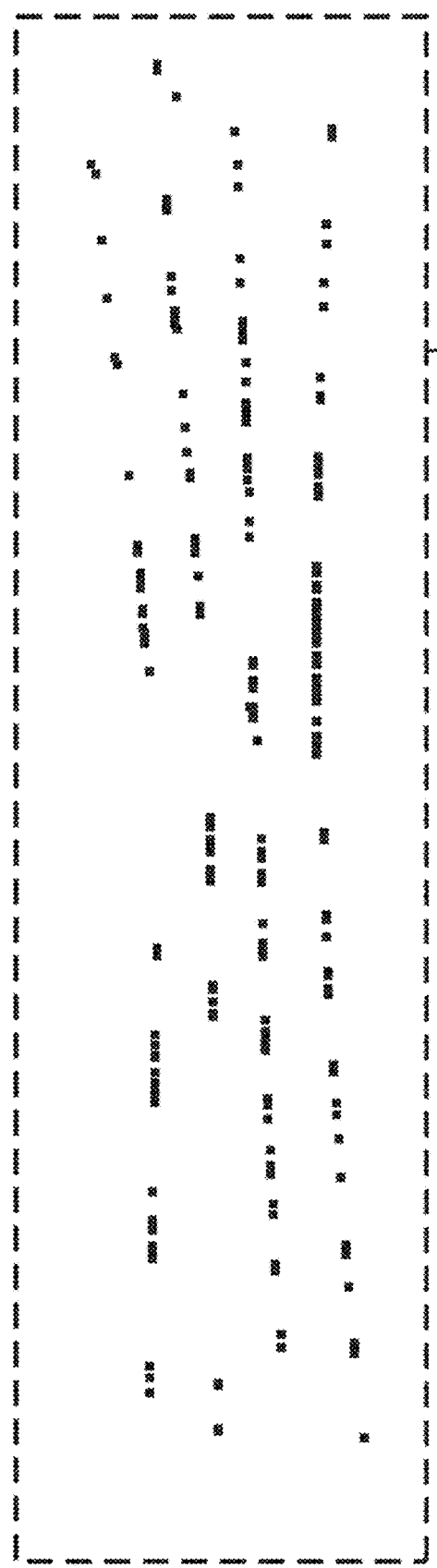

For example, FIG. 4C is an example depth data 430 derived from a 3D point cloud generated a radar sensor (e.g., a radar sensor 242) for the scene shown in FIG. 4A. The 3D point cloud is projected onto a 2D image plane to provide the depth data 430, each point in the depth data 430 is annotated (or otherwise associated) with a depth measure derived from the Z coordinates of the 3D point cloud. The depth data 430 contains a sparse number of pixels arranged due to the sparsity of the 3D point cloud. By comparison, 3D point clouds generated by radar sensors are significantly sparser than those from LiDAR sensors and have a limited vertical view (e.g., radar measurements provide measurements within a horizontal slice of the scene). As described above, some of the pixels in the depth data 430 are invalid (e.g., pixels shown as white in FIG. 4C) due to a lack of valid information in the 3D point cloud for the corresponding position. Since radar sensors produce 3D point clouds having far fewer points than LiDAR sensors, there will be less information to project and, by extension, fewer valid pixels in the projected image plan. Thus, the sparsity (or imprecision) may induce a degree of error or uncertainty in the depth measures obtained by a radar sensor.

Additionally, the range sensor data 306 may be noisy such that those annotated points within the scene include a further degree of error or uncertainty in the depth measurements. For example, in the case of radar sensors, depth measures for each point is noisy, inherently injecting uncertainty to each depth measure. For example, the noise in the depth measures can be due to range errors (e.g., a point is closer/further away than measured), radial errors (e.g., the point projection is not where it should be), and/or multiple reflections. Radar sensors are much noisier in each aspect, relative to LiDAR sensors. Even though a radar sensor generated 3D point cloud includes sparsity and noise in the depth measures, the information provides for sufficient supervision to facilitate overcoming scale ambiguities within the depth model 304 when used as an additional refinement process for training in combination with a self-supervision process.

As an additional comparison of the FIGS. 4B and 4C, note that within FIG. 4B, the depth data is sufficiently dense to convey details of existing features/objects such as vehicles, etc. However, within the projected image of FIG. 4C, the depth data is sparse, noisy and imprecise. The depth data vaguely characterizes the corresponding scene according to distributed points across the scene that do not generally provide detail of specific features/objects depicted therein and includes inherent uncertainty in the depth measurement. Thus, sparse depth data that is noisy across the scene may not provide enough data for some purposes such as object classification but does provide sufficient information to determine distances of an object that may be used by the depth model 304 to improve the depth estimates included in the depth map 308.

Accordingly, the noise and sparsity in the range sensor may be derived from the range sensor data 306 and stored uncertainty data 310. For example, the uncertainty in the range sensor data 306 may be estimated as a 3D covariance matrix containing the uncertainty derived from noise and imprecision in the 3D point cloud provided by the range sensor 246. The 3D covariance matrix may be generated based on a noise model of the range sensor 306 and calibrated based on an angle and distance to target (e.g., an object in the environment). The 3D covariance matrix may be projected onto a 2D image plan, with this projection stored as the uncertainty data 310. For example, the 3D covariance matrix can be projected by taking a slice of an ellipsoid that is parallel to the image plane.

Figure 4D:
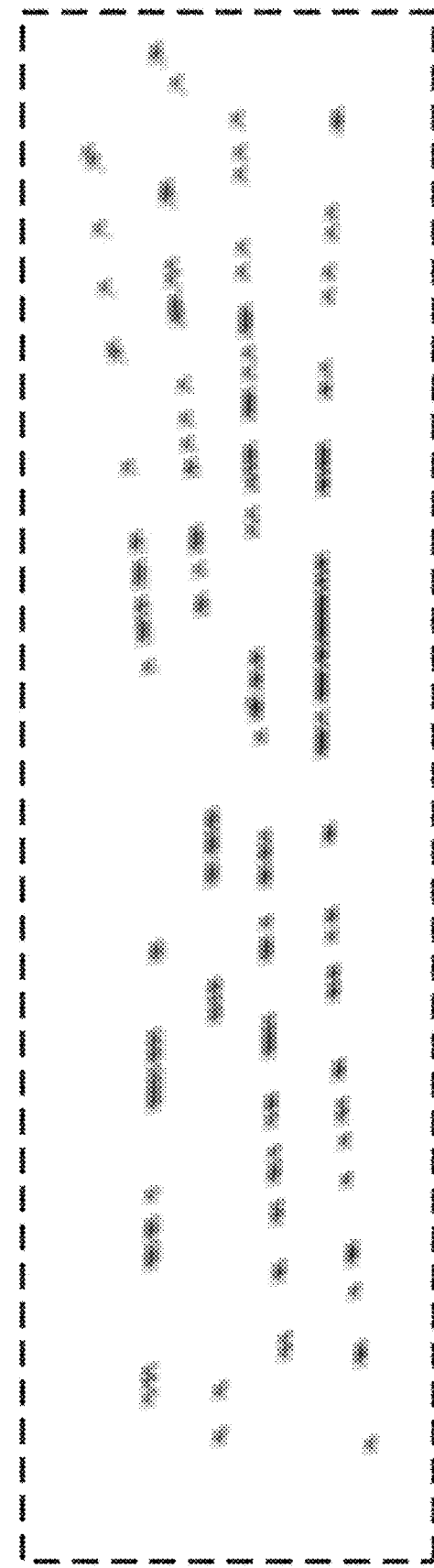

In one example, the 3D covariance matrix may be projected onto the sparse depth data 308. For example, the 3D covariance matrix derived from a given 3D point cloud can be projected on the 2D image plane of the sparse depth data 308 that was generated from the given 3D point cloud. In some embodiments, a center of a 2D projection is the point in the 3D covariance matrix with the highest probability, and points around this central point are weighted by a Gaussian distribution with standard deviation given by the projected 2D ellipse. In any case, projection of the 3D covariance matrix results in a numerous pixels within a small area of the 2D image plane annotated with depth measures, where the area may correspond to a given range sensor measurement. Thus, each point of the sparse depth data 308 is blurred resulting in blurred sparse depth data for the given 3D point cloud, which is used in place of the cleaner, unblurred sparse depth data 308 for subsequent processing. For example, FIG. 4D is illustrates an example blurred sparse depth data 440 generated by projecting a 3D covariance matrix onto the 2D image plane of the sparse depth data 430. As seen in FIG. 4D, each point from FIG. 4C is blurred as a result of projecting uncertainty data 310 unto the depth data 430.

The depth module 320 uses the depth model 304 to derive depth maps 308 from the image data 302, the sparse depth data 308, and the uncertainty data 310. In one example, the sparse depth data 308 is blurred sparse depth data 308. For example, a monocular image 248, containing a scene of an environment, of image data 302 is provided as an input into the depth model 304 and blurred sparse depth data 308 corresponding to the scene is provided as a second input. The depth model 304, in an example, includes an encoder that accepts the monocular image 248 and the blurred sparse depth data 308 as separate electronic inputs and processes the inputs to extract the depth features and derive the depth map 312. In various embodiments, the model 304 identifies an exemplary flow of processing channels formed by the model 304 for processing the inputs. For example, the depth model 304 forms one or more color channels for processing the monocular image 248 and a channel for processing the blurred sparse depth data 308. In the case of an RGB monocular image 248, model forms three color channels for processing the monocular image (e.g., one channel for each color).

In another example, uncertainty data 310 is provided as an input, separate from the sparse depth data 308 (e.g., the sparse depth data 308 is unblurred as shown in FIG. 4C). For example, a monocular image 248 is provided as an input into the depth model 304 along with sparse depth data 308 and uncertainty data 310 corresponding to the scene of included in the monocular image 248. In this case, the encoder of the depth model 304 accepts the monocular image 248, the sparse depth data 308, and the uncertainty data 310 as separate electronic inputs and processes the inputs to extract the depth features and derive the depth map 312. For example, the depth model 304 forms one or more color channels for processing the monocular image 248, a channel for processing the sparse depth data 308, and a channel for processing the uncertainty data 310.

The depth model 304 may be machine learning algorithm/model. For example, the depth model 304 may be a convolutional neural network (CNN) or an encoder/decoder architecture including convolutional and deconvolutional components. While the depth model 304 is discussed as a separate, distinct component, in one or more approaches, the depth model 304 may be integrated with the depth module 320. Thus, the depth module 320 may implement various routines/functions of the model 304 while storing data values (e.g., weights) of the depth model 304 in the data store 205.

Figure 5:
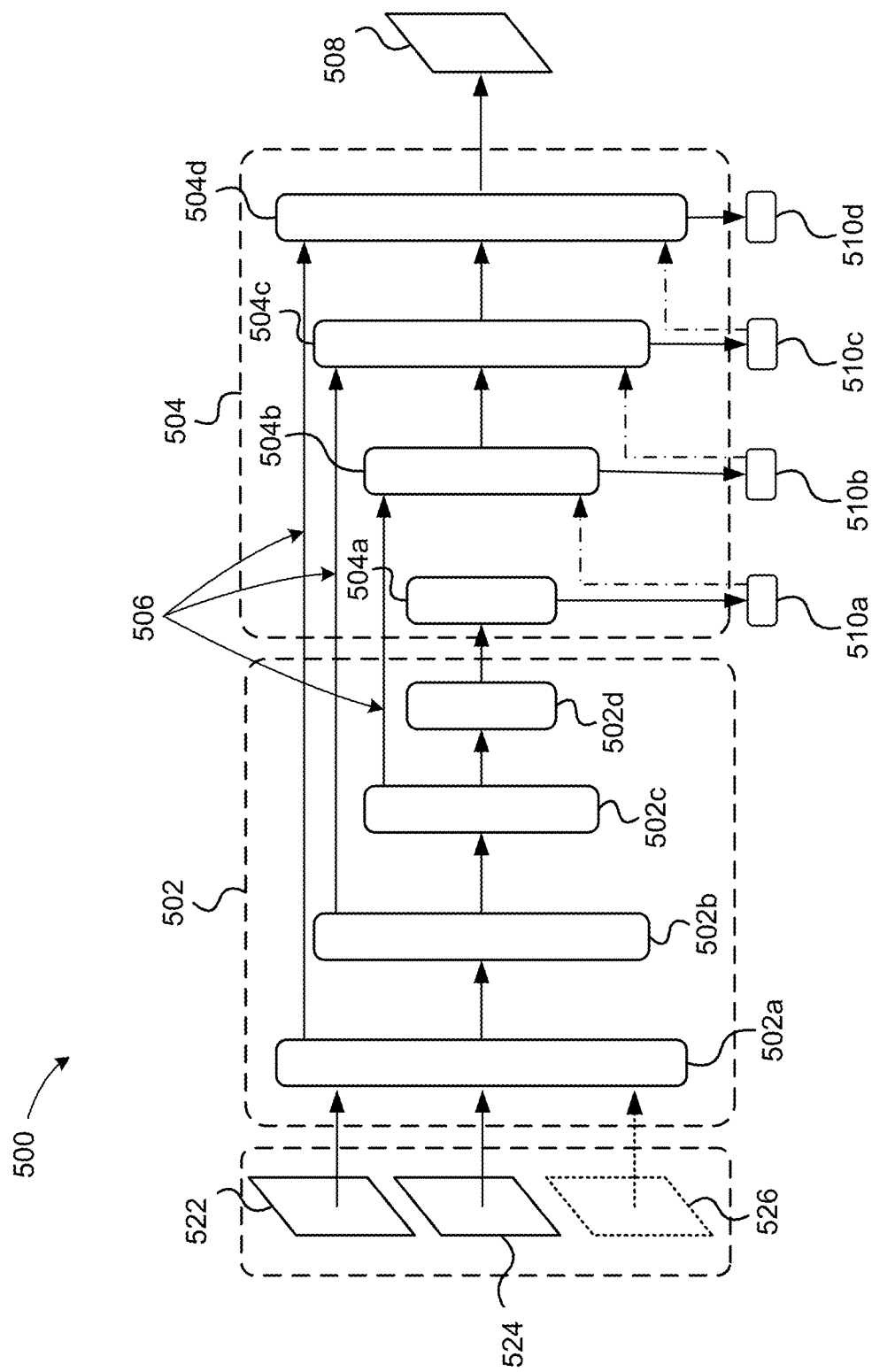
FIG. 5 illustrates a schematic block diagram of an example depth model according to embodiments disclosed herein.

FIG. 5 illustrates a schematic block diagram of an example depth model 500 according to embodiments disclosed herein. The depth model 500 is an example implementation of depth model 304 of FIG. 3. The example depth model 500 identifies an exemplary flow for processing inputs such as a monocular image of the image data 302, sparse depth data 308, and/or the uncertainty data 310. As noted above, depth model 500 is generally a machine learning algorithm/model, and is illustrated in FIG. 5 as a CNN or encoder/decoder architecture including convolutional and deconvolutional components.

As shown in FIG. 5, the depth network 500 includes an encoder 502 and a decoder 504. The depth network 500 generates a per-pixel depth map 508, such as the depth map 312 of FIG. 3, of an input image 522. According to aspects of the present disclosure, the input image 522 may be a monocular image, such as the monocular image 248 described with reference to FIGS. 2 and 3.

The encoder 502 accepts input data 520 as electronic inputs, which the encoder 502 processes to extract depth features therefrom to generate the depth map 508. For example, input data 520 includes at least the input image 522 and input sparse depth data 524. The input sparse depth data 524 may be blurred sparse depth data 308 (e.g., as blurred sparse depth data 440 of FIG. 4D) that includes sparse depth data and uncertainty projected thereon, as set forth above. In another example, the input sparse depth data 522 may be unblurred (e.g., as sparse depth data 430 of FIG. 4C), for example, where input data 520 includes uncertainty data 526. In this case, uncertainty data 526 may be uncertainty data 310 of FIG. 3, which is explicitly input into the encoder 502 along with the sparse depth data 524 and image 522 (as shown as an optional dotted line).

The encoder 502 accepts the inputs 520 as electronic inputs and processes the inputs to extract depth features therefrom. For example, the inputs 520 comprise one or more channels for the image 522 based on the color model of the image 522 (e.g., 3 channels in the case of RGB monocular images) and a channel for the sparse depth data 524. In the case where uncertainty data 526 is explicitly input into encoder 502, the depth model 500 forms another input channel for the uncertainty data 526 separate from the channels for the image 522 and the sparse depth data 524. In any case, the depth features are aspects of the inputs that are indicative of spatial information intrinsically encoded therein.

In an example architecture, encoder 502 includes multiple encoder layers 502a-d. Encoder layers 502a-d may include packing layers for downsampling features during the encoding process. For example, encoding layers 502a-d may include a series of layers that function to fold (e.g., adapt dimensions of the feature map to retain the features) encoded features into separate channels, iteratively reducing spatial dimensions of the inputs while packing additional channels with information about embedded states of the features. The addition of the input channels for inputting the sparse depth data 524 and/or uncertainty data 526 may require additional encoder layers to process the uncertainty contained therein. These layers may process the sparse depth data 524 and/or uncertainty data 526 to avoid the lossy nature of the encoding process and facilitates the preservation of more information (e.g., feature details) about the image 522. For example, the blurred sparse depth data may provide ground-truths used for training the depth model within the bounds of the uncertainty given by the 3D covariance matrix, such that the ground-truth depth is not localized in a single point but rather on an area. This area, being weighted by a Gaussian distribution with standard deviation of the 3D covariance matrix. In the case of uncertainty data 526, an additional uncertainty channel is introduced, which is used as additional information for supervision at training the depth model.

In some embodiments, the encoding layers 502a-d may be formed from a combination of two-dimensional (2D) convolutional layers, packing blocks, and residual blocks. While the encoder 502 is presented as including the noted components, it should be appreciated that further embodiments may vary the particular form of the encoding layers (e.g., convolutional and pooling layers without packing layers), and thus the noted configuration is one example implementation the depth model 304.

The separate encoding layers 502a-d generate outputs in the form of encoded feature maps (also referred to herein as tensors), which the encoding layers 502a-d provide to subsequent layers in the depth model 500, including specific layers of the decoder 504 via skip connections 506. Thus, the encoder 502 includes a variety of separate layers that operate on the input data 520, and subsequently on derived/intermediate feature maps that convert the visual information of the input data 520 into embedded state information in the form of encoded features of different channels. In any case, the output of the encoder 502 may be a feature map having the same dimensions in pixel height and width, even though it was generated from a higher-dimensional input, that is transformed in relation to the input data 520 (e.g., n×H×W, where n is the number of input channels, H is the number of pixels in the height direction, and W is the number of pixels in the width direction).

The decoder 504 includes multiple decoder layers 504a-d. In FIG. 5, each decoder layer 504a-d may be an unpacking layer for upsampling features during the decoding process. As with the encoder 502, the addition of the channels for inputting of the sparse depth data 524 and/or uncertainty data 526 may require additional decoder layers to process the uncertainty contained therein to. That is, each decoder layer 504a-d may unpack a received feature map. For example, the decoder 504 may unfold (e.g., adapt dimensions of the tensor to extract the features) the previously encoded spatial information in order to derive the depth map 508 (e.g., at separate intermediate inverse depth maps 510a-d) according to learned correlations associated with the encoded features. That is, the decoding layers generally function to up-sample, through sub-pixel convolutions and other mechanisms, the previously encoded features into the depth map 508. In one embodiment, the decoding layers comprise unpacking blocks, two-dimensional convolutional layers, and inverse depth layers that function as output layers for different scales. While the decoder 504 is presented as including the noted components, it should be appreciated that further embodiments may vary the particular form of the decoding layers (e.g., deconvolutional layers without unpacking layers), and thus the noted configuration is one example implementation of the depth model 304.

The decoder layers 504a-d may generate intermediate inverse depth maps 510a-d. Each of the intermediate inverse depth maps 510a-d may be upsampled before being concatenated with a corresponding one of the skip connections 506 and feature maps unpacked by a corresponding decoder layer 504a-d. The intermediate inverse depth maps 510a-d also serve as the output of the depth model 500 from which a loss can be calculated.

As previously noted, the disclosed architecture of the encoder 502 may include packing blocks that fold encoded features into additional channels in order to preserve spatial information across the separate layers. In addition to folding the encoded features into the additional channels, the encoder 502 may provide residual information directly to the decoder 504 via the skip connections 506. The skip connections 506 are, for example, connections between layers of the encoder 502 and the decoder 504 that convey higher-resolution encoded information between the encoder 502 and the decoder 504 thereby facilitating a flow of information (e.g., feature maps and gradients) to improve the depth map 508 (e.g., increase available detail). For example, skip connections 506 may transmit activations and gradients between encoder layers 502*a-d* and decoder layers 504*a-d*. A gradient may be directly back-propagated to layers via the skip connections 506, thereby improving training to facilitate resolving higher resolution details. Additionally, the skip connections 506 directly transmit Features from convolutional layers to deconvolutional layers, thereby improving image recovery at higher resolutions.

The packing and unpacking blocks, in some embodiments, include additional sub-layers or routines. For example, the packing block may include a Space-2-Depth layer, a first reshaping layer, a three-dimensional (3D) convolutional layer, a second reshaping layer, and a 2D convolutional layer. By contrast, the unpacking block includes, in one embodiment, a 2D convolutional layer, a first reshaping layer, a 3D convolutional layer, a second reshaping layer, and a Depth-2-Space layer. The packing block and the unpacking block may be repeated throughout the encoder 502 and the decoder 504 according to various dimensions associated with a particular placement and integrating with the pixel-adaptive convolutions as described below.

In any case, the packing blocks may function to fold spatial dimensions of intermediate convolutional feature maps into extra channels, thereby capturing sub-pixel information across the encoding layers to retain details of the input data 520. The packing blocks may replace, in one approach, striding and pooling layers by implementing the space-2-depth layer followed by the 3D convolutional layer. The space-2-depth layer itself, in one embodiment, functions to fold the additional channels into the intermediate feature map via sub-pixel convolutions. Thus, the space-2-depth layer, in combination with the 3D convolutional layer, function to aggregate packed feature maps and process spatial information folded into the extra channels. For example, the packing blocks achieve this by reshaping an input (e.g., an intermediate feature map from a prior layer) to produce a new channel that is subsequently concatenated back into an original channel after processing. The 2D convolutional layer then reduces the aggregated feature map to a desired number of output channels.

The unpacking blocks may function to unfold convolutional feature channels from the encoding layers into spatial dimensions thereby leveraging sub-pixel convolutions of the depth-2-space layer for the preservation of details in the output depth map 508. The unpacking block leverages the depth-2-space layer as a replacement of, for example, convolutional feature up-sampling. The depth-2-space layer provides for a sub-pixel convolution operation that super-resolves output depth maps, and is combined with an additional 3D convolutional operation in the unpacking block to further aggregate information across the decoding layers. That is, the depth-2-space operation functions to unfold information from packed feature channels into spatial dimensions thereby providing a larger but shallower output that effectively super-resolves the depth estimates. The 2D convolution of the unpacking blocks functions to provide a requisite number of feature channels for the subsequent 3D convolutional layer. Arranging the 2D and 3D convolutions in this manner permits the 3D convolution to fully exploit packed spatial information by promoting feature aggregation across all three dimensions. The resulting feature maps may then be super-resolved to a target dimension/scale for output as the depth map 508.

The range data module 340 may include instructions that function to control the processor 206 to execute various actions in support of the depth module 320. For example, in some embodiments, the range data module 340 may receive range sensor data 306 from range sensors, for example, radar sensor 242. The range data module 340 may provide the range sensor data 306 to the depth module 320. The range data module 340, in one or more implementations, may acquire the range sensor data 306 by controlling the range sensor to detect returned signals emitted by the range sensor via passively receiving the range sensor data 306 from a data bus, or electronic memory, or another available communication pathway of system 200. The range data module 340 may also perform pre-processing on the range sensor data 306 to provide the range sensor data 306 in a format that is accepted by the depth model 320.

In some embodiments, the range data module 340 may include instructions that function to control the processor 206 to execute various actions to derive the sparse depth data 308 from the range sensor data 306. For example, the range data module 340 may project a 3D point cloud included in the range sensor data 306 onto a 2D image plane to generate the sparse depth data 308, as described above. For example, the range data module 340 may generate the depth data 430 shown in FIG. 4C.

In some embodiments, the range data module 340 may include instructions that function to control the processor 206 to execute various actions to acquire the uncertainty data 310 from the range sensor data 306. For example, the range data module 340 may derive a 3D covariance matrix from the 3D point cloud included in the range sensor data 306. In some embodiments, the range data module 340 may project the 3D covariance matrix onto a 2D image plan as uncertainty data 310, as described above. In another embodiment, the range data module 340 may project the 3D covariance matrix onto the sparse depth data 308 to generate a blurred sparse depth data 308, as described above. For example, the range data module 340 may generate the blurred sparse depth data 440 shown in FIG. 4D.

In various embodiments, the range data module 340 may output sparse depth data 308 and/or uncertainty data 310 to the depth module 320 and/or depth model 304 for deriving depth map 312 as described above. For example, in one implementations, the range data module 340 may output the blurred sparse depth data 308 as an input into the depth model 304 (e.g., as input 524 of the depth model 500), along with a monocular image 248. In another implementation, the range data module 340 may output uncertainty data 310 and sparse depth data 308 (e.g., without the uncertainty data projected thereon) as inputs into the depth model (e.g., as inputs 526 and 524 of depth model 500, respectively, along with the monocular image 248. In either case, the depth module 320 and/or depth model 304 processes the inputs to derive a depth map 312.

Moreover, the image module 330 may include instructions that function to control the processor 206 to execute various actions in support of the depth module 320. For example, in some embodiments, the image module 330 may receive an image 248 from the image sensor 246 and provide the image 248 to the depth module 320. The image module 330, in one or more implementations, may acquire the image 248 by controlling the image sensor 246 to capture the image 248 via passively receiving the image 248 from a data bus, or electronic memory, or another available communication pathway of system 200. The image module 330 may also perform pre-processing on the image 248 to provide the image 248 in a format that is accepted by the depth model 320.

In some embodiments, the image module 330 may handle outputs from the depth module 320 and/or depth model 304. For example, the image module 330 may include instructions to, for example, perform one or more post-processing routines, provide the depth map 312 to additional subsystems of system 200 in order to control the operation of the subsystems and/or the vehicle 10 overall, and so on. In some embodiments, the image module 330 may communicate the depth map 312 to a remote system (e.g., cloud-based server) as, for example, a mechanism for mapping the surrounding environment or for other purposes (e.g., traffic reporting, etc.). As one example, the image module 330 may use the depth map 312 to map locations of obstacles in the surrounding environment and plan a trajectory that safely navigates the obstacles in an autonomous or semi-autonomous operation and/or operate advance collision warning systems. Thus, the image module 330, in one embodiment, uses the depth map 312 to control the vehicle 100 to navigate through the surrounding environment. In another example, alone or in combination with obstacle detection and mapping, the image module 330 may use the depth map 312 to create 3D reconstructions of the environment surrounding the system 200.

In further embodiments, the image module 330 may convey the depth map 312 to internal systems/components of the vehicle 10, such as the autonomous and/or semi-autonomous control systems 226 or other systems 220. By way of example, in one arrangement, the image module 330 may acquire the depth map 312 and convey the depth map 312 to the autonomous and/or semi-autonomous control systems 226 in a particular scale that the autonomous and/or semi-autonomous control systems 226 accepts as an electronic input. In this way, the depth estimation system 200 may inform the autonomous and/or semi-autonomous control systems 226 of the depth estimates to improve situational awareness and planning of the autonomous and/or semi-autonomous control systems 226. As such, the autonomous and/or semi-autonomous control systems 226 may acquire the depth map 312 as a source of depth information for the surrounding environment or, in one approach, as a secondary source that verifies other means (e.g., LiDAR data). The autonomous and/or semi-autonomous control systems 226 is provided as one example, and the image module 330 may provide the depth map 312 to other components separately or in parallel with providing to autonomous and/or semi-autonomous control systems 226.

Furthermore, in some embodiments, the image module 330 may include instructions to train the depth model 304. The image module 330 may train the depth model 304 using a self-supervised scale-aware structure from motion (SfM) process. Thus, to initiate the depth model 304, the image module 330 may use images from video of a scene and formulates the generation of the depth map 312 as a photometric error minimization across the images. The image module 330 may train the depth model 304 by causing the depth module 320 to execute the depth model 304 as though the typical operation is underway, however, the image module 330 may provide one of the images from the video as the monocular image 250 for processing.

Figure 6:
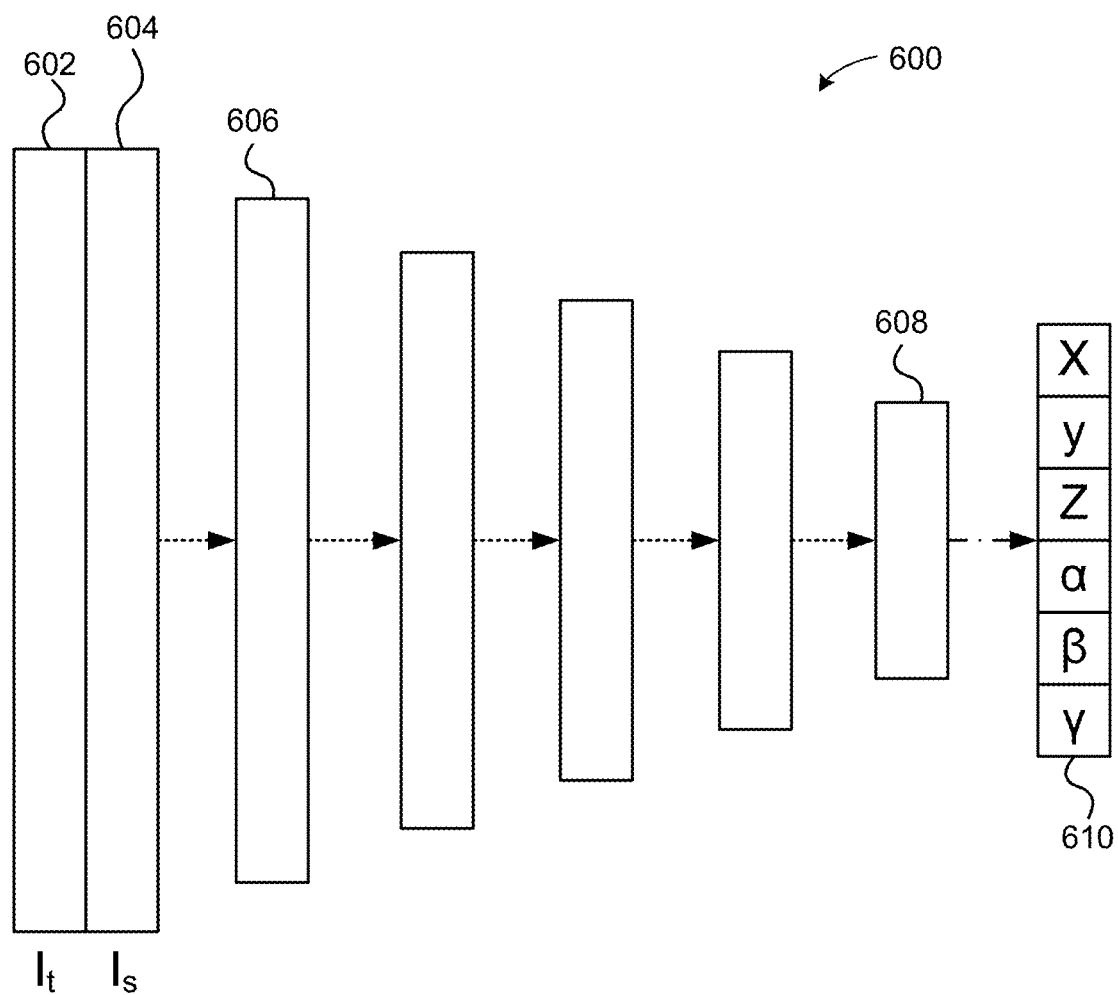
FIG. 6 illustrates an example pose network for motion estimation according to aspects of the present disclosure.
Figure 6:
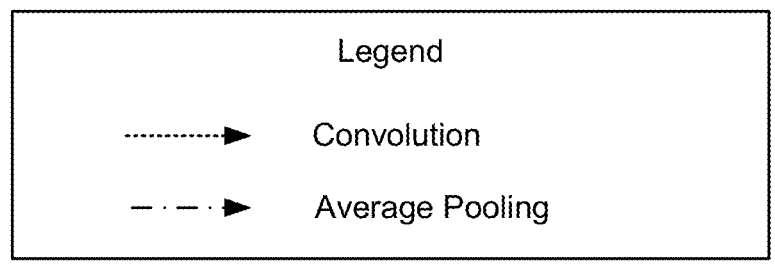

Accordingly, in relation to the architecture 500 described in FIG. 6, the image module 330 may train the depth model 500 on inputs 520. The image module 330 may use the resulting map 508 to synthesize matching image pairs from the video in combination with a rigid-body transformation (e.g., 6-DoF SE(3) or the like).

FIG. 6 illustrates an example pose network 600 for motion estimation according to aspects of the present disclosure. Pose network 600 is an example implementation of the pose model 314 of FIG. 3. The pose network 600 is, for example, a convolutional neural network that is comprised of a series of convolutional and average pooling layers. As shown in FIG. 6, the pose network 600 includes multiple convolutional layers 606, a final convolutional layer 608, and a multi-channel (e.g., six-channel) average pooling layer 610. The final convolutional layer 608 may be a 1×1 layer. The multi-channel average pooling layer 610 may be a six-channel layer.

In an example configuration, a target image (It) 602 and a source image (Is) 604 are input to the pose network 600. The target image 602 and the source image 604 may be concatenated when input to the pose network 600. During training, the source image 604 may be used during different training epochs. The source image 604 may include an image at a previous time step (t−1) and an image at a subsequent time step (t+1). The output is a set of six degrees of freedom (DoF) transformations between the target image 602 and the source image 604. The process may be repeated for each source image 604 if more than the source image 604 is considered.

In some embodiments, the image module 330 may use the six DoF transformation to produce a synthesized image, which can then be compared with the target image 602 to determine an error. The error is, for example, photometric loss, a reprojection loss, and/or another loss value that can be used to assess the accuracy of the depth model 304. Thus, the image module 330 may use the calculated loss to adjust the depth model 304, thereby training the depth model 304 to produce depth estimates using video comprised of monocular images as opposed to, for example, image pairs from a stereo camera.

The image module 330 may train the depth model 304 over a training data set of monocular video images. Through the process of training the depth model 304, the image module 330 may adjust various hyper-parameters in the depth model 304 to fine-tune the functional blocks included therein. Accordingly, the image module 330 may train the encoder 502 and/or the decoder 504, including the various functional blocks included therein. Moreover, the image module 330 may further implement a generative neural network or other algorithm to synthesize matching images from the depth map 312 and the six DoF transformation. In various approaches, the generative network can be integrated as part of the depth model 304 or implemented in a standalone configuration. In either case, the image module 330 may be executed to train the model 304 in a self-supervised approach through the use of pairs of monocular images from the video, and, in a further arrangement, also trains the pose network 314 in combination using the loss as at least part of a loss function to adapt the pose network 314.

Through this training process, the depth model 304 may develop a learned prior of the monocular images as embodied by the internal parameters of the depth model 304 from the training on the images, which uses sparse depth data as an input for generating the depth map 312. In general, the depth model 304 develops the learned understanding about how depth relates to various aspects of an image according to, for example, size, perspective, and other features that may be guided by the sparse depth data. Consequently, the resulting trained depth model 304 can be leveraged by the depth estimation system 200 to estimate depths from monocular images that do not include an explicit modality identifying the depths.

Figure 7:
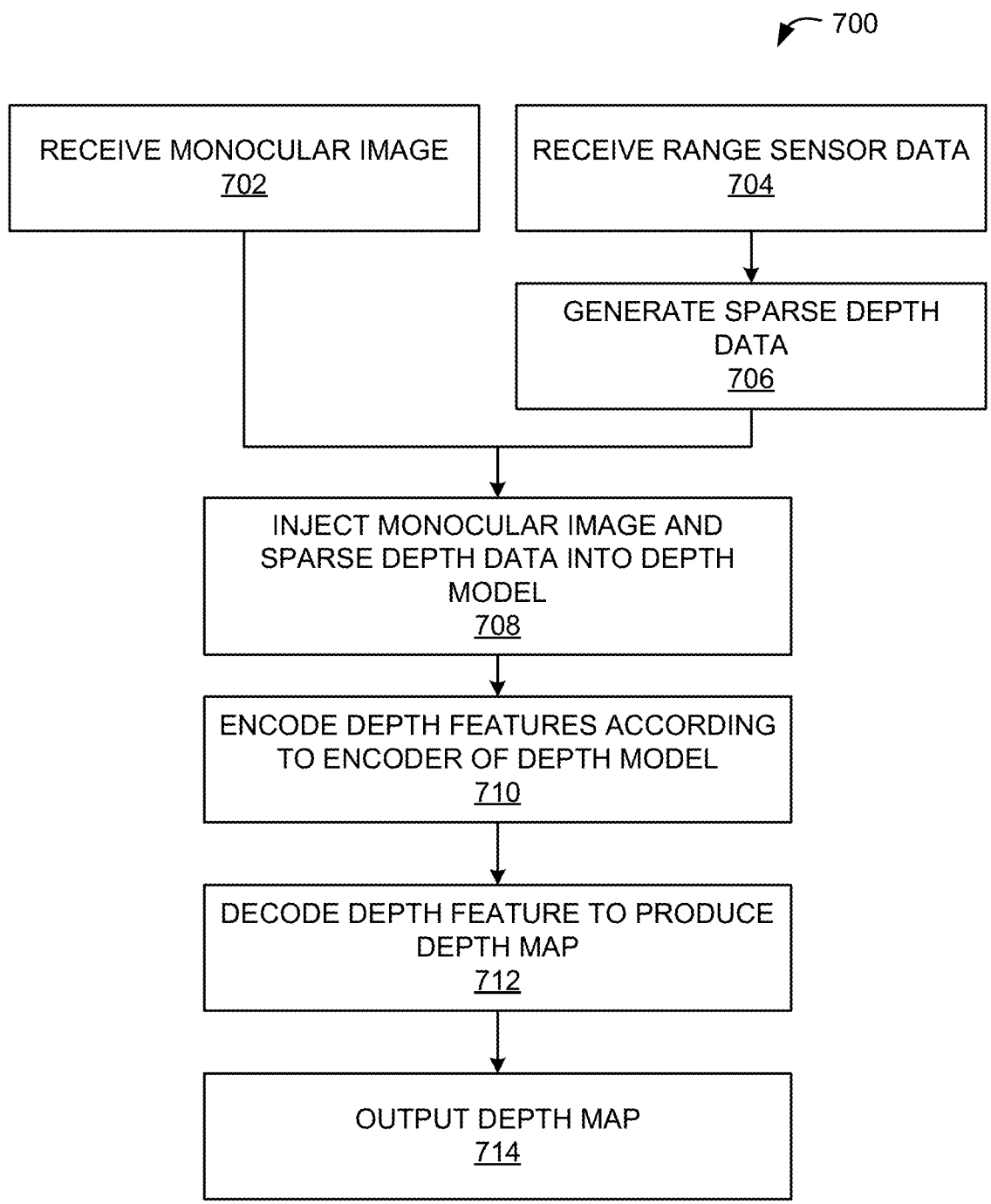
FIG. 7 is a flow chart illustrating example operations for monocular depth estimation in accordance with various embodiments disclosed herein.

FIG. 7 is a flow chart illustrating example operations for monocular depth estimation in accordance with various embodiments disclosed herein. FIG. 7 illustrates a process 700 that may be implemented as instructions, for example, stored on memory 208, that when executed by one or more processors 206 to perform the operations of process 700. Process 700 will be discussed with reference to the depth estimation system 200 and depth estimation circuit 210 of FIGS. 2-3. However, process 700 is not limited to being implemented within the depth estimation system 200 but is instead one example of a system that may implement the process 700.

At block 702, a monocular image is received. For example, the image module 330 may receive a monocular image 248. The image module 330 may acquire the monocular image 248 locally from image sensor 246 or through a communication link with a remote system (e.g., a cloud-based server resident on a network). Thus, while the depth estimation system 200 is generally described as implemented within a particular device that is, for example, actively navigating an environment, the depth estimation system 200 may also function as a cloud-based computing service to analyze monocular images for depth information or as a statically mounted device in an environment (e.g., mounted to a traffic signal). As previously described, the monocular image 248 itself may have different characteristics according to different implementations but generally is a single image that does not include explicit depth information.

At block 704, range sensor data is received. For example, the range data module 340 may receive range sensor data 306. The range data module 340 may acquire the range sensor data 306 locally from a range sensor, such as radar sensor 242, or through a communication link with a remote system (e.g., a cloud-based server resident on a network). As previously described, the range sensor data 306 may be provided as a 3D point cloud where each point in the 3D point cloud is provided at a position according to a 3D coordinate space. The range sensor data 306 corresponds to the environment surrounding the image sensor 246 at a point in time that the image sensor 246 captured the monocular image 248 of block 702. That is, the range sensor data 306 includes a 3D point cloud of the environment surrounding the image sensor 246, a portion of which includes features included in the monocular image 248.

At block 706, sparse depth data is generated. For example, the range data module 340 may derive sparse depth data 308 from the range sensor data 306. In various embodiments, the range data module 340 may project the 3D point cloud to a 2D image plane as depth data (e.g., depth data 430 of FIG. 4C). Additionally, noise and sparsity in the range sensor data 306 is derived therefrom as uncertainty data 310, for example, by deriving a 3D covariance matrix from the 3D point cloud. In one implementation, the uncertainty data 310 is integrated into the sparse depth data 308 to generate a blurred sparse depth data 308 (e.g., blurred sparse depth data 440 of FIG. 4D).

At block 708, the monocular image from block 702 and the sparse depth data from block 706 are injected into a depth model. For example, the monocular image 248 may be provided by the image module 330 to the depth module 320 as an input on one or more channels formed by the depth model 304 and the sparse depth data 308 may be provided by the range data module 340 as an input on a separate one or more channels formed by the depth model 304. The monocular image 248 may be RGB monocular image and thus would be input on three channels; however, any number of channels may be used dependent on the color model of the monocular image 248. In a case where the sparse depth data 308 is blurred sparse depth data (e.g., uncertainty is integrated therein as shown in FIG. 4D), the sparse depth data and uncertainty data included therein is input on a single channel formed by the depth model 304. In another implementation, the depth model 304 creates an additional input channel on which the uncertainty data 310 is explicitly provided with the sparse depth data 308 provided on a separate input channel.

At block 710, depth features are encoded according to the encoder of the depth model. For example, the depth module 304 encodes the monocular image 248 and the sparse depth data 308 (integrated with uncertainty data 310 or with uncertainty data provided explicitly as a separate input) according to encoding layers of the depth model 304. As previously described, the encoder (e.g., encoder 502 of FIG. 5) includes multiple separate layers arranged in succession that function, when executed by the depth module 320, to iteratively encode the monocular image 248 and sparse depth data 308 (integrated with uncertainty data 310 or with uncertainty data provided explicitly as a separate input) to generate feature maps at successively refined representations. In other words, the encoder accepts the monocular image 248 one or more electronic inputs and sparse depth data as separate electronic inputs (e.g., one input for blurred sparse depth data or two inputs for uncertainty data and sparse depth data) and then proceeds to iteratively encode features represented therein across the separate encoding layers. Thus, the encoding layers generate successively refined intermediate feature maps across the layers that are generally characterized by different dimensions, as described above in connection with FIG. 5.

At block 712, the depth features encoded at block 710 are decoded to produce a depth map. For example, the depth module 320 decodes the depth features from the encoder of the depth model 304 according to decoding layers of the depth model 304 that include pixel-adaptive convolutions. As described above, decoder (e.g., decoder 504 of FIG. 5) may unfold the previously encoded spatial information in order to derive a depth map according to learned correlations associated with the encoded features. That is, the decoding layers generally function to up-sample, through sub-pixel convolutions and other mechanisms, the previously encoded features into the depth map.

At block 714, the depth model produced at block 712 is output. For example, the image module 330 provides the depth map 312 as the depth estimates of components (e.g., objects, surfaces, etc.) represented in the monocular image 248. In some embodiments, the image module 330 electronically provides the depth map 312 to other subsystems of the system 200 and/or vehicle 10 in support of, for example, autonomous planning and navigation. In further implementations, the image module 330 communicates the depth map 312 to a remote device that originally provides the image 248 as a response to an original request for depth information.

Figure 8:
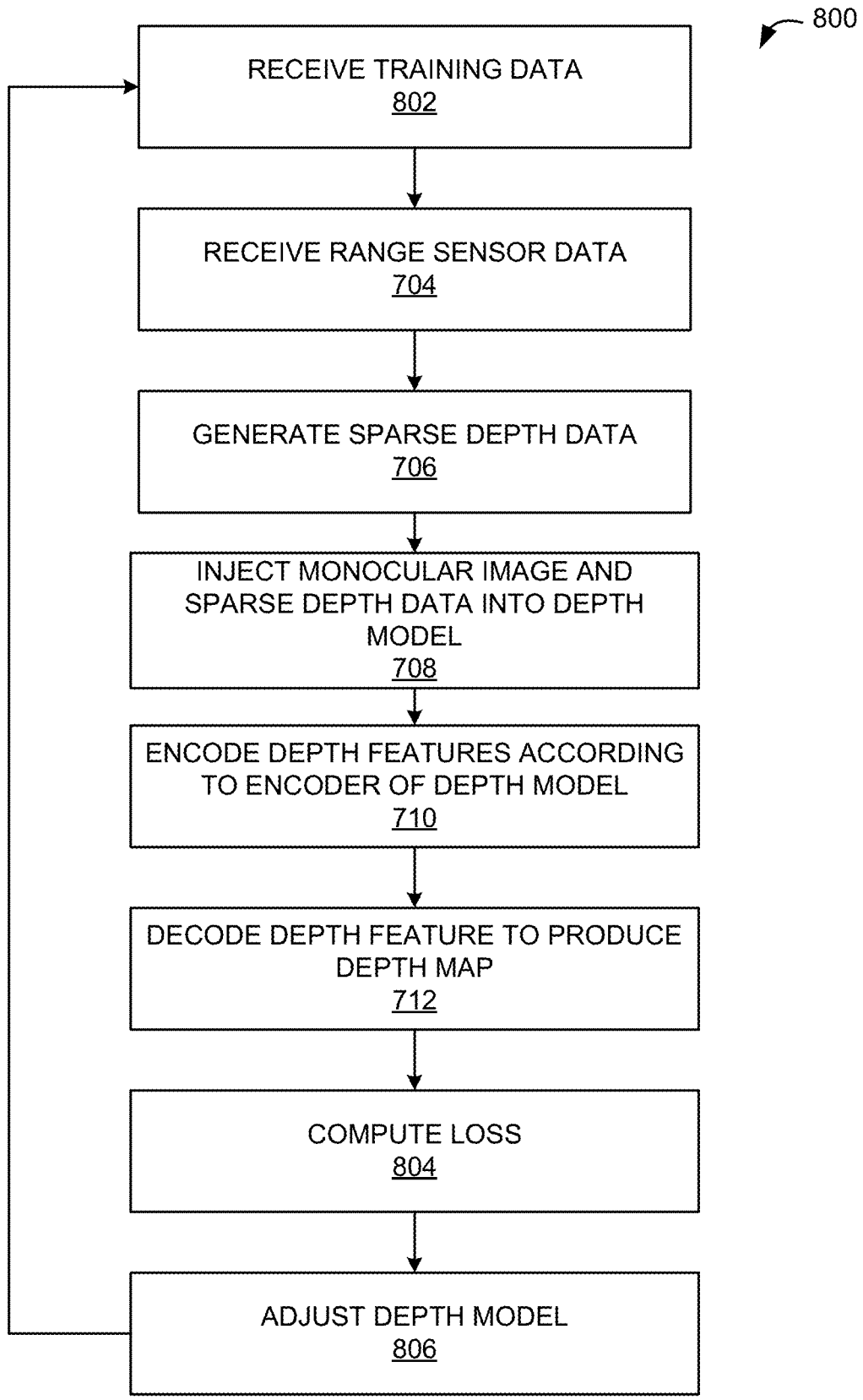
FIG. 8 is a flow chart illustrating example operations for training a depth model in accordance with various embodiments disclosed herein.

FIG. 8 is a flow chart illustrating example operations for training a depth model in accordance with various embodiments disclosed herein. FIG. 8 illustrates a process 800 that may be implemented as instructions, for example, stored on memory 208, that when executed by one or more processors 206 to perform the operations of process 800. Process 800 will be discussed with reference to the depth estimation system 200 and depth estimation circuit 210 of FIGS. 2-3. However, process 800 is not limited to being implemented within the depth system 200 but is instead one example of a system that may implement the process 800. In some implementations, many of the functions discussed in relation to FIG. 7 above are repeated as part of training the depth model 304, and, thus, will not be repeated for purposes of the brevity of this disclosure.

At block 802, training data is received. For example, the image module 330 receives the training data that includes separate monocular images from an image sensor (e.g., image sensor 246) that form a video. Thus, an individual round of training for the depth model 304 includes two monocular images of a same scene from the video. The images may be consecutive but are generally separated by multiple intervening images in the video. This form of training is generally characterized as a self-supervised process that leverages a structure from motion (SfM) approach. Thus, the depth model 304 is executed over one of the images of the pair in the same fashion as previously described at blocks 708-712.

At block 802, range sensor data is included as part of the training data. For example, the range data module 340 receives the training data that includes range sensor data corresponding to the two monocular images from an image sensor. Thus, an individual round of training for the depth model 304 includes two 3D point clouds of range sensor data 306 corresponding to the same scene from the video. Thus, the depth model 304 is executed over one of range sensor data of the pair in the same fashion as previously described at blocks 704-712.

Thus, after the depth model 304 generates the depth map, the image module 330 may execute further training routines. For example, at block 804, the image module 330 computes a loss. The loss characterizes an accuracy of the depth model 304 in producing the depth map 312. The loss may take different forms such as a photometric loss, a reprojection loss, a combination of different losses, and so on. In any case, the image module 330 synthesizes an image from the depth map 312 and a transformation generated by the pose model 314 according to the pair of inputs images.

At block 806, the image module 330 uses the loss to adapt the depth model 304. In one embodiment, adapting the depth model 304 may include changing weights within separate layers of the model 304. Thus, the image module 304 may change weights within the convolutions of the encoder (e.g., encoder 502) and/or decoder (e.g., decoder 504) when training the model 304. In this way, the depth estimation system 200 improves the generation of depth estimates by the depth model 304.

Figure 9:
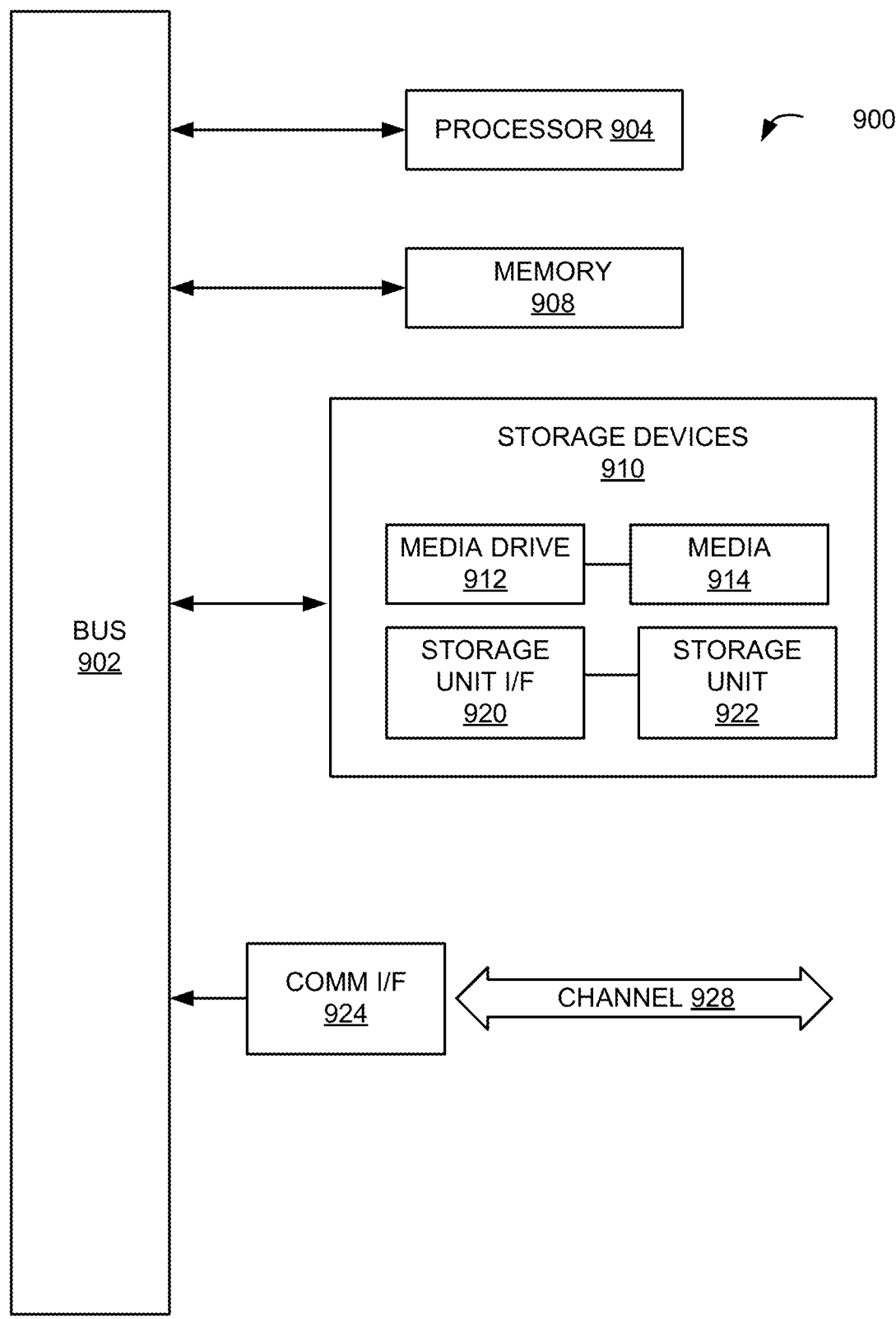
FIG. 9 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 9. Various embodiments are described in terms of this example-computing component 900. After reading this description, it will become apparent to a person skilled in the relevant art how to implement the application using other computing components or architectures.

Referring now to FIG. 9, computing component 900 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, portable computing devices, and other electronic devices that might include some form of processing capability.

Computing component 900 might include, for example, one or more processors, controllers, control components, or other processing devices. This can include a processor, and/or any one or more of the components making up user vehicle 10, depth estimation system 200, and cloud. Processor 904 might be implemented using a general-purpose or special-purpose processing engine such as, for example, a microprocessor, controller, or other control logic. Processor 904 may be connected to a bus 902. However, any communication medium can be used to facilitate interaction with other components of computing component 900 or to communicate externally.

Computing component 900 might also include one or more memory components, simply referred to herein as main memory 908. For example, random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid-state drive, a magnetic tape drive, an optical drive, a compact disc (CD) or digital video disc (DVD) drive (R or RW), or other removable or fixed media drive might be provided. Storage media 914 might include, for example, a hard disk, an integrated circuit assembly, magnetic tape, cartridge, optical disk, a CD or DVD. Storage media 914 may be any other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory component) and memory slot. Other examples may include a PCMCIA slot and card, and other fixed or removable storage units 922 and interfaces 920 that allow software and data to be transferred from storage unit 922 to computing component 900.

Computing component 900 might also include a communications interface 924. Communications interface 924 might be used to allow software and data to be transferred between computing component 900 and external devices. Examples of communications interface 924 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 924 may be carried on signals, which can be electronic, electromagnetic (which includes optical) or other signals capable of being exchanged by a given communications interface 924. These signals might be provided to communications interface 924 via a channel 928. Channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   generating, based on range sensor data, a point cloud representative of a scene of an environment;
   calculating, from the range sensor data, range sensor uncertainty of one or more points of the point cloud;
   generating blurred depth data by projecting the range sensor uncertainty onto the depth data; and
   deriving a depth map for an image of the scene based on the blurred depth data as an input into a depth model.

2. The method of claim 1, further comprising:
   projecting the point cloud onto an image plane to produce depth data.

3. The method of claim 2, wherein the depth map is derived based on the depth data.

4. The method of claim 2, wherein the depth map for the image is derived based on the depth data as a first input into the depth model and the range sensor uncertainty as a second input into the depth model.

5. The method of claim 1, wherein the range sensor uncertainty is a 3D covariance matrix derived from the point cloud.

6. The method of claim 1, wherein the one or more inputs into the depth model comprises a first input and a second input, wherein the depth map for the image is derived from the image as the first input, and the point cloud and the range sensor uncertainty as the second input.

7. The method of claim 6, wherein the image is a monocular image.

8. The method of claim 1, wherein the range sensor produces a sparse point cloud.

9. The method of claim 8, wherein the range sensor is a radar sensor.

10. A system, comprising:
memory; and
one or more processors configured to execute machine readable instructions stored in the memory for performing a method comprising:
generating depth data by projecting a 3D point cloud generated by a radar sensor onto a 2D image plane, the 3D point cloud representing a scene of an environment;
calculating, from the depth data, a 3D covariance matrix for one or more points of the 3D point cloud projected onto the 2D image plane;
generating blurred depth data by projecting the 3D covariance matrix onto the depth data; and
deriving a depth map for an image of the scene based on the blurred depth data as an input into a depth model.

11. The system of claim 10, wherein the depth map for the image is derived based on the depth data as a first input into the depth model and the 3D covariance matrix as a second input into the depth model.

12. The system of claim 10, wherein the one or more inputs into the depth model comprises a first input and a second input, wherein the depth map for the image is derived from the image as the first input, and the depth data and 3D covariance matrix as the second input.

13. The system of claim 12, wherein the image is a monocular image.

14. The system of claim 10, wherein the radar sensor produces a sparse 3D point cloud.

15. A non-transitory computer-readable medium for training a depth model for depth estimation from images and including instructions that when executed by one or more processors cause the one or more processors to:
obtain depth data based on a point cloud representing a scene of an environment generated by a range sensor;
estimate range sensor uncertainty for each point in the depth data based on the point cloud;
generate blurred depth data by projecting the range sensor uncertainty onto the depth data;
generate a depth map for an image based on the blurred depth data as an input into a depth model; and
train the depth model using a pose model to account for motion between the image and a source image.

16. The non-transitory computer-readable medium of claim 15, wherein the instructions further cause the one or more processors to:
project the point cloud onto an image plane to produce the depth data.

17. The non-transitory computer-readable medium of claim 15, wherein the range sensor uncertainty is a 3D covariance matrix derived from the point cloud.

18. The non-transitory computer-readable medium of claim 15, wherein the range sensor is a radar sensor that produces a sparse point cloud.

19. The non-transitory computer-readable medium of claim 16, wherein the depth map is derived based on the depth data.

20. The non-transitory computer-readable medium of claim 15, wherein the image is a monocular image.

* * * * *